US012269234B2

(12) United States Patent
Chun et al.

(10) Patent No.: US 12,269,234 B2
(45) Date of Patent: Apr. 8, 2025

(54) METHODS AND SYSTEMS FOR PRODUCING PRESSWARE

(71) Applicant: Brown LLC, Beaverton, MI (US)

(72) Inventors: Victor L Chun, Beaverton, MI (US); Steffen Brown, Beaverton, MI (US); Russ Bliss, Beaverton, MI (US); Philip Eichbauer, Beaverton, MI (US); Brian Keeley, Beaverton, MI (US); Robert Abel, Beaverton, MI (US)

(73) Assignee: BROWN LLC, Beaverton, MI (US)

( * ) Notice: Subject to any disclaimer, the term of this patent is extended or adjusted under 35 U.S.C. 154(b) by 0 days.

(21) Appl. No.: 18/363,206

(22) Filed: Aug. 1, 2023

(65) Prior Publication Data

US 2023/0373181 A1 Nov. 23, 2023

Related U.S. Application Data

(63) Continuation-in-part of application No. 18/161,177, filed on Jan. 30, 2023, now Pat. No. 12,076,957, (Continued)

(51) Int. Cl.
*B31B 50/00* (2017.01)
*B31B 50/10* (2017.01)
(Continued)

(52) U.S. Cl.
CPC .......... *B31B 50/005* (2017.08); *B31B 50/006* (2017.08); *B31B 50/102* (2017.08);
(Continued)

(58) Field of Classification Search
CPC ..... B31B 50/005; B31B 50/12; B31B 50/592; B31B 50/252; B31B 50/102;
(Continued)

(56) References Cited

U.S. PATENT DOCUMENTS

| | | | |
|---|---|---|---|
| 3,604,652 | A | 9/1971 | Sleeper |
| 3,768,950 | A | 10/1973 | Ihde |

(Continued)

FOREIGN PATENT DOCUMENTS

| | | | |
|---|---|---|---|
| CN | 109279426 | | 1/2019 |
| WO | 2016185097 | A1 | 11/2016 |
| WO | 2021001276 | A1 | 1/2021 |

OTHER PUBLICATIONS

Non-Final Office Action mailed Jan. 29, 2024 in related U.S. Appl. No. 18/161,177. 27 pages.

*Primary Examiner* — Thomas M Wittenschlaeger
(74) *Attorney, Agent, or Firm* — HOVEY WILLIAMS LLP

(57) ABSTRACT

A system for forming a pressware product comprises rollers, a scoring tool, a scoring station actuator, a forming tool, and a forming station actuator. The rollers pull the web along a path having an angle. The scoring tool receives the material from the rollers and includes a vertically shiftable scoring punch with an edge that extends about an outline of the pressware product and a striker plate. The scoring station actuator shifts the scoring tool to form a slot in the web. The forming tool receives the scored web and includes a vertically shiftable positive mold assembly and negative mold assembly. The forming station actuator shifts the positive mold assembly to press against the web and form the pressware product.

18 Claims, 31 Drawing Sheets

Related U.S. Application Data which is a continuation of application No. 17/369,348, filed on Jul. 7, 2021, now Pat. No. 11,919,270.

(51) Int. Cl.

| | |
|---|---|
| ***B31B 50/12*** | (2017.01) |
| ***B31B 50/14*** | (2017.01) |
| ***B31B 50/25*** | (2017.01) |
| ***B31B 50/59*** | (2017.01) |
| ***B31F 1/00*** | (2006.01) |
| *B31B 110/40* | (2017.01) |

(52) U.S. Cl.

CPC ............ *B31B 50/12* (2017.08); *B31B 50/142* (2017.08); *B31B 50/252* (2017.08); *B31B 50/592* (2018.05); *B31F 1/0009* (2013.01); *B31B 2110/40* (2017.08)

(58) Field of Classification Search

CPC ................ B31B 50/142; B31B 50/006; B31B 2120/002; B31B 2110/20; B31B 2110/10; B31B 2110/40; B31B 2100/00; B31F 1/0009

See application file for complete search history.

(56) References Cited

U.S. PATENT DOCUMENTS

| | | | |
|---|---|---|---|
| 4,415,515 | A | 11/1983 | Rosenberg |
| 4,416,133 | A | 11/1983 | Doyle |
| 4,539,072 | A | 9/1985 | Frye et al. |
| 4,680,023 | A | 7/1987 | Varano |
| 4,775,086 | A | 10/1988 | Kataoka |
| 4,952,281 | A | 8/1990 | Akira |
| 5,237,381 | A | 8/1993 | Hamada |
| 5,450,102 | A | 9/1995 | Ishida et al. |
| 5,485,386 | A | 1/1996 | Andreasson |
| 5,539,511 | A | 7/1996 | Wenthe, Jr. et al. |
| 5,566,906 | A | 10/1996 | Kamada et al. |
| 5,727,367 | A | 3/1998 | Cahill et al. |
| 5,787,331 | A | 7/1998 | Ohkuma et al. |
| 5,975,745 | A | 11/1999 | Oishi et al. |
| 6,106,453 | A | 8/2000 | Sinn et al. |
| 6,142,045 | A | 11/2000 | Coxe |
| 6,199,859 | B1 | 3/2001 | Schauer et al. |
| 6,206,815 | B1 | 3/2001 | Focke et al. |
| 6,613,253 | B1 | 9/2003 | Negishi et al. |
| 6,908,189 | B2 | 6/2005 | Miyamoto et al. |
| 6,908,242 | B2 | 6/2005 | Oshima et al. |
| 7,036,923 | B2 | 5/2006 | Takagi et al. |
| 7,182,008 | B2 | 2/2007 | Hegishi et al. |
| 7,229,167 | B2 | 6/2007 | Miyamoto et al. |
| 7,281,678 | B2 | 10/2007 | Matsugi |
| 7,419,462 | B1 | 9/2008 | Zelinski |
| 7,618,204 | B2 | 11/2009 | Blanchard, Jr. et al. |
| 7,713,580 | B2 | 5/2010 | Yamamoto et al. |
| 8,047,834 | B2 | 11/2011 | Sofronie et al. |
| 8,086,158 | B2 | 12/2011 | Domoto et al. |
| 8,430,660 | B2 | 4/2013 | Johns et al. |
| 8,721,064 | B2 | 5/2014 | Miyamoto et al. |
| 8,795,571 | B2 | 8/2014 | Bryl et al. |
| 9,346,643 | B2 | 5/2016 | Ito |
| 9,896,372 | B2 | 2/2018 | Vogt et al. |
| 9,969,192 | B2 | 5/2018 | Suzuki et al. |
| 10,353,324 | B2 | 7/2019 | Oura |
| 10,562,256 | B2 | 2/2020 | Vassa et al. |
| 10,562,728 | B2 | 2/2020 | Ota et al. |
| 10,661,522 | B2 | 5/2020 | Fukuda |
| 10,703,064 | B2 | 7/2020 | Vassa et al. |
| 11,235,488 | B2 | 2/2022 | Lim |
| 11,396,155 | B2 | 7/2022 | Block |
| 2003/0137572 | A1 | 7/2003 | Miyamoto et al. |
| 2003/0156176 | A1 | 8/2003 | Miyamoto et al. |
| 2003/0197298 | A1 | 10/2003 | Hegishi et al. |
| 2005/0098674 | A1 | 5/2005 | Matsugi |
| 2005/0281964 | A1 | 12/2005 | Yamamoto et al. |
| 2007/0042072 | A1* | 2/2007 | Johns ...................... B29C 43/36 425/394 |
| 2007/0072758 | A1 | 3/2007 | Van Oosterhout |
| 2007/0221024 | A1 | 9/2007 | Negishi et al. |
| 2007/0248396 | A1 | 10/2007 | Blanchard, Jr. et al. |
| 2009/0190984 | A1 | 7/2009 | Yamamoto et al. |
| 2009/0232926 | A1 | 9/2009 | Sofronie et al. |
| 2010/0238251 | A1 | 9/2010 | Tsuzawa |
| 2010/0314801 | A1* | 12/2010 | O'Hagan ............ B29C 45/1418 425/112 |
| 2012/0037680 | A1 | 2/2012 | Ito |
| 2013/0057629 | A1 | 3/2013 | Miyamoto et al. |
| 2016/0136981 | A1 | 5/2016 | Suzuki et al. |
| 2016/0176145 | A1 | 6/2016 | Vassa et al. |
| 2016/0176146 | A1* | 6/2016 | Vassa .................... B31B 50/592 493/56 |
| 2016/0176147 | A1 | 6/2016 | Vassa et al. |
| 2016/0185647 | A1 | 6/2016 | Vogt et al. |
| 2017/0253452 | A1 | 9/2017 | Ota et al. |
| 2018/0067423 | A1 | 3/2018 | Oura |
| 2018/0154602 | A1 | 6/2018 | Block et al. |
| 2018/0178479 | A1 | 6/2018 | Kellermann |
| 2018/0236683 | A1 | 8/2018 | Lim |
| 2019/0352117 | A1 | 11/2019 | Mosegaard et al. |
| 2019/0381753 | A1 | 12/2019 | Fukuda |
| 2020/0298548 | A1 | 9/2020 | Hancock et al. |
| 2023/0008774 | A1 | 1/2023 | Chun et al. |
| 2023/0009038 | A1 | 1/2023 | Chun et al. |
| 2023/0010876 | A1 | 1/2023 | Chun et al. |
| 2023/0011906 | A1 | 1/2023 | Chun et al. |
| 2023/0034788 | A1 | 2/2023 | Lee et al. |
| 2023/0173779 | A1 | 6/2023 | Chun et al. |

* cited by examiner

METHODS AND SYSTEMS FOR PRODUCING PRESSWARE

RELATED APPLICATIONS

The present application is a continuation-in-part of and claims priority with regard to all common subject matter to co-pending U.S. application Ser. No. 18/161,177, entitled "METHODS AND SYSTEMS FOR PRODUCING PRESSWARE", filed on Jan. 30, 2023, which is a continuation of and claims priority to co-pending U.S. application Ser. No. 17/369,348, entitled "METHODS AND SYSTEMS FOR PRODUCING PRESSWARE", filed on Jul. 7, 2021; the contents of both are hereby incorporated in their entireties by reference herein.

BACKGROUND

Environmental imperatives are causing pressware manufacturers to transition from synthetic plastics to more sustainable materials such as paper to manufacture plates, bowls, trays, and other pressware. Current techniques for producing pressware include making blanks from a roll of material, scoring the blanks, and transporting the blanks via jets of air and gravity to a forming tool. However, such techniques are not reliable and prone to jams due to curling of the blanks. For example, pressware made of paper material involves unwinding the paper from a roll, which imparts an intrinsic curl on the paper. The curl gets more extreme as the paper roll diameter gets smaller. The blanks retain the intrinsic curl and frequently cause jams or mislocate as they are moved to the forming tool due to the curl. Current solutions for counteracting the intrinsic curl include providing decurling rollers that are manually adjusted by an experienced operator as the system is operating to account for increased curl. However, this solution is prone to human error, which results in jamming, and also requires expensive labor.

Further, the blanks can only include a single row of products due to the means of transporting the blanks to the forming station. The row is typically four or five products; therefore, the production rate is only four or five parts per machine stroke.

The background discussion is intended to provide information related to the present invention which is not necessarily prior art.

SUMMARY OF THE INVENTION

The present invention solves the above-described problems and other problems by providing systems and methods for producing pressware from a web of a roll of material that enable increased production rates, lower labor costs, and fewer jams.

A system constructed according to an embodiment of the present invention comprises a plurality of rollers, a scoring tool, a scoring station actuator, a forming tool, and a forming station actuator. The rollers are configured to pull the web along a path with an angle. The scoring tool is operable to receive the material from the rollers. The scoring tool includes a scoring punch and a striker plate that are vertically shiftable relative to one another. The scoring punch includes an edge that extends about a shape representing an outline of the pressware. The scoring station actuator is configured to shift at least one of the scoring punch or the striker plate of the scoring tool to press the web between the scoring punch and the plate to form a slot in the web that extends about the outline of the pressware.

The forming tool is configured to receive the web from the scoring tool. The forming tool includes a positive mold assembly and a negative mold assembly that are vertically shiftable relative to one another. The forming station actuator is configured to shift at least one of the positive mold assembly or the negative mold assembly to press the web between the positive mold assembly and the negative mold assembly to form the pressware from the web.

A method of producing pressware from a web of a roll of material according to an embodiment of the present invention broadly comprises pulling the web, via a plurality of decurling station rollers, along a path forming an angle; pressing, via a scoring station actuator, the web between a scoring punch and a plate of a scoring tool to impart a slot in the web along an outline of the pressware; pressing, via a forming station actuator, the web between a positive mold assembly and a negative mold assembly to form the pressware; and pulling, via a suction cup, the pressware from either the negative mold assembly or the positive mold assembly.

A system according to another embodiment of the present invention broadly comprises a decurling station frame, a pair of pull roller assemblies, a decurl roller, a decurling station actuator, a scoring station frame, a scoring tool, a scoring station actuator, a forming station frame, a forming tool, and a forming tool actuator. The pull roller assemblies are spaced apart from one another on the decurling station frame. Each of the pull roller assemblies includes a pull roller and a pinch roller configured to pull the web from the roll of material. The decurl roller is vertically-shiftable and is positioned between the pair of pull roller assemblies on the decurling station frame. The decurling station actuator is configured to vertically shift the decurl roller.

The scoring station frame is positioned proximate to the decurling station frame. The scoring tool is supported on the scoring station frame and includes a scoring punch and a striker plate that are vertically shiftable relative to one another. The scoring punch includes edges extending radially about a shape representing an outline of the pressware. The scoring station actuator is configured to shift the scoring punch vertically relative to the striker plate of the scoring tool to press the web between the scoring punch and the striker plate and form slots in the material that extend radially about the outline of the pressware.

The forming station frame is positioned proximate to the scoring station frame. The forming tool is supported on the forming station frame and includes a positive mold assembly and a negative mold assembly that are vertically shiftable relative to one another. The forming tool actuator is configured to shift the positive mold assembly and the negative mold assembly vertically relative to one another to press the web between the positive mold assembly and the negative mold assembly to form the pressware in the web.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
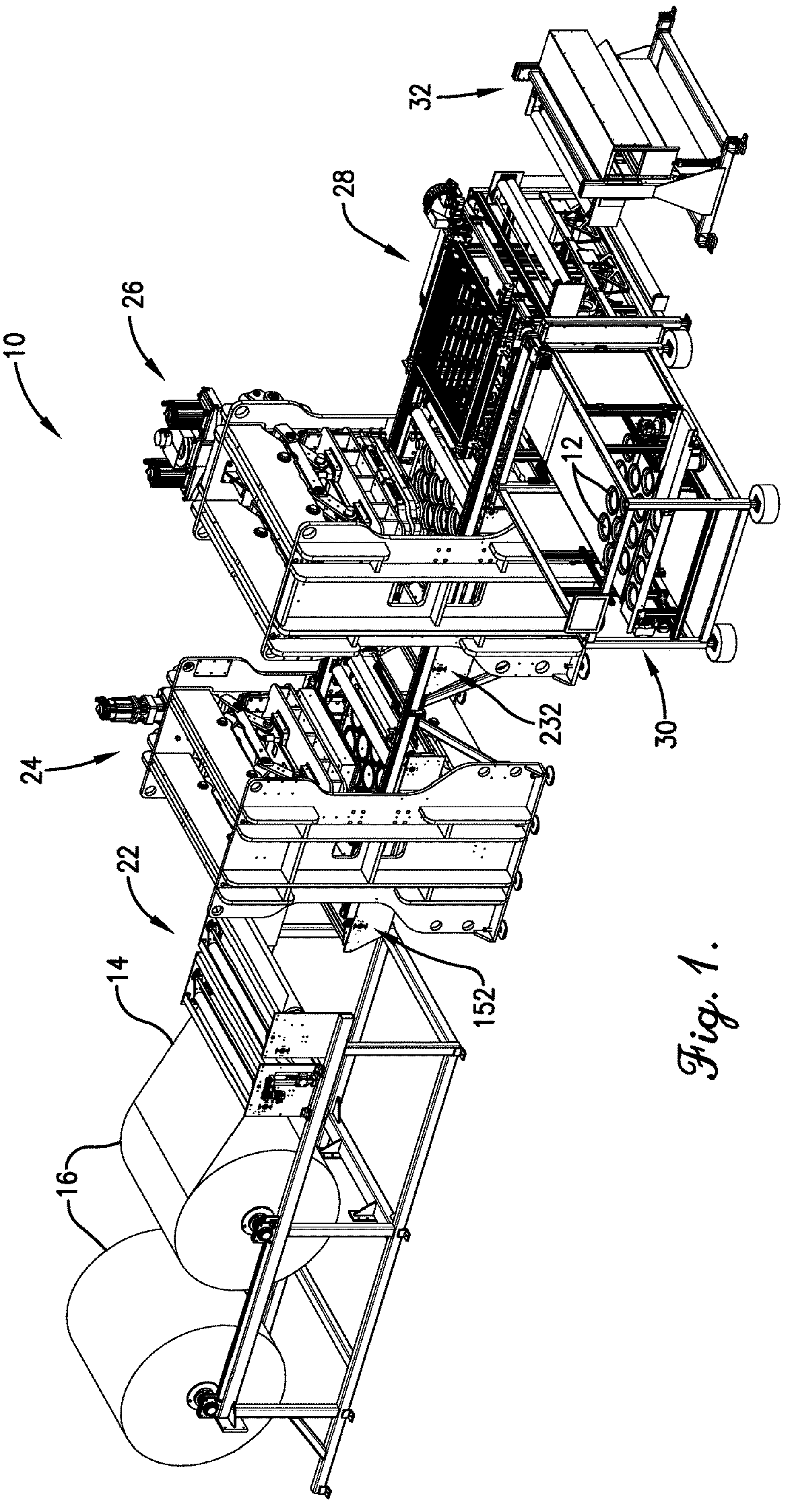
FIG. 1 is a perspective view of a system for producing pressware constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
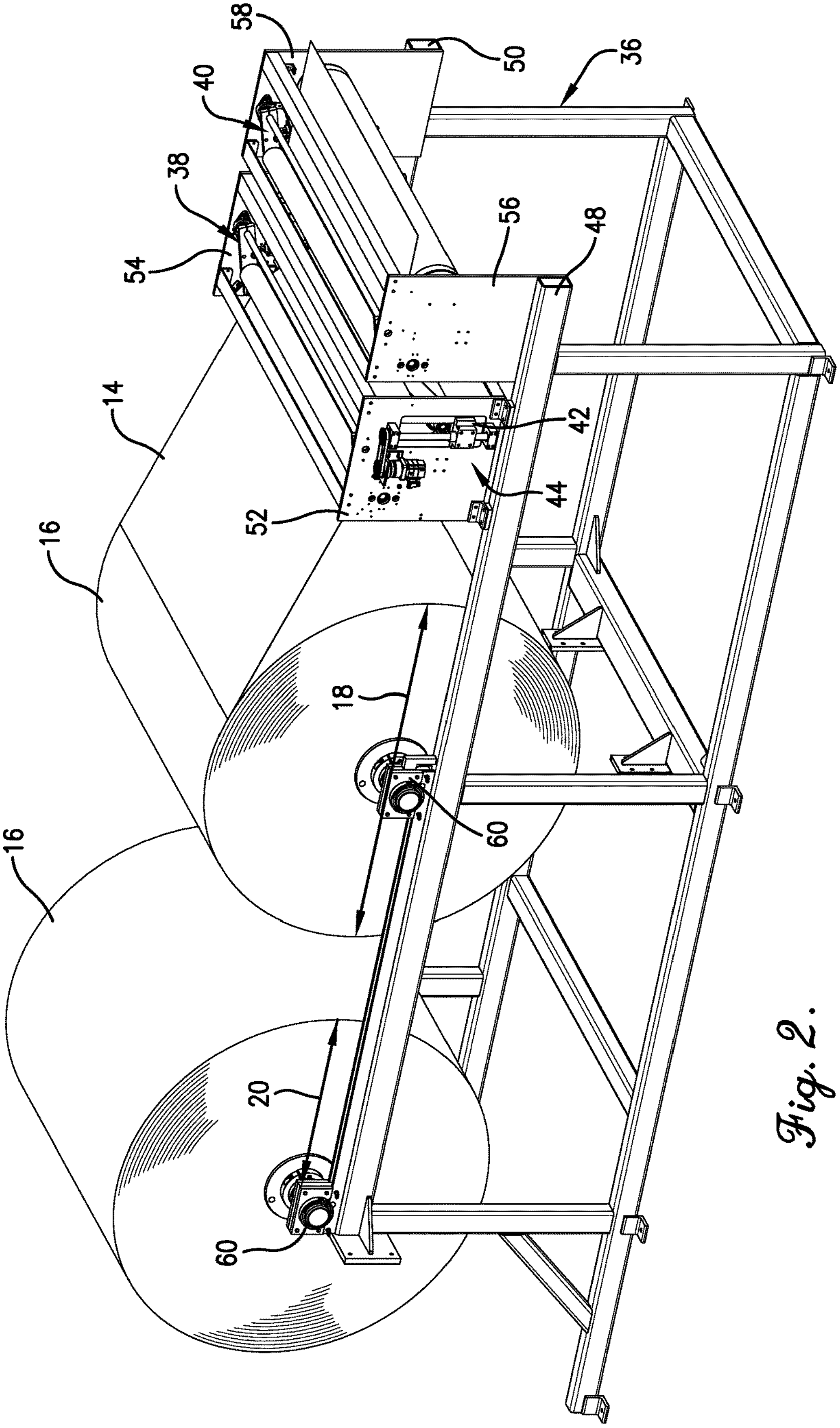
FIG. 2 is an elevated perspective view of a decurling station of the system of FIG. 1.
Figure 3:
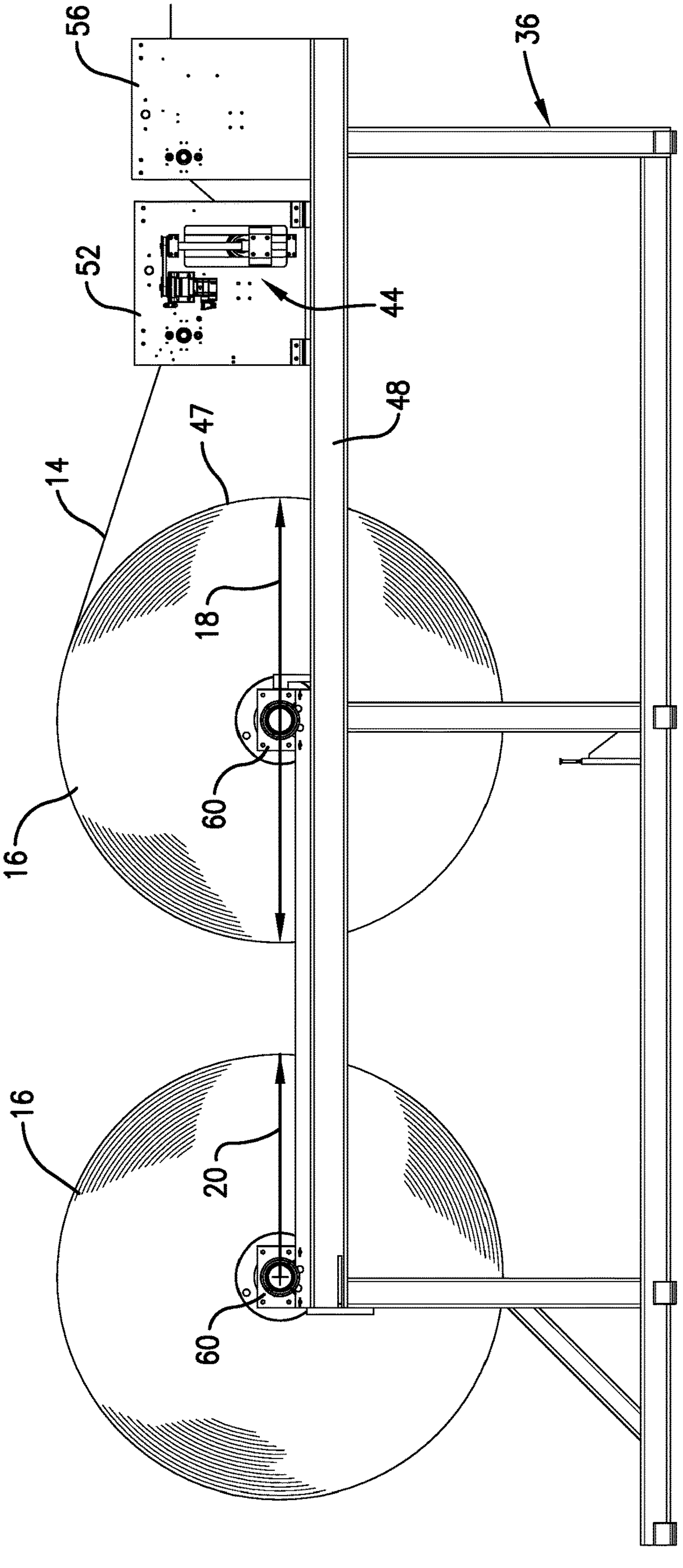
FIG. 3 is a side perspective view of the decurling station of FIG. 2.
Figure 4:
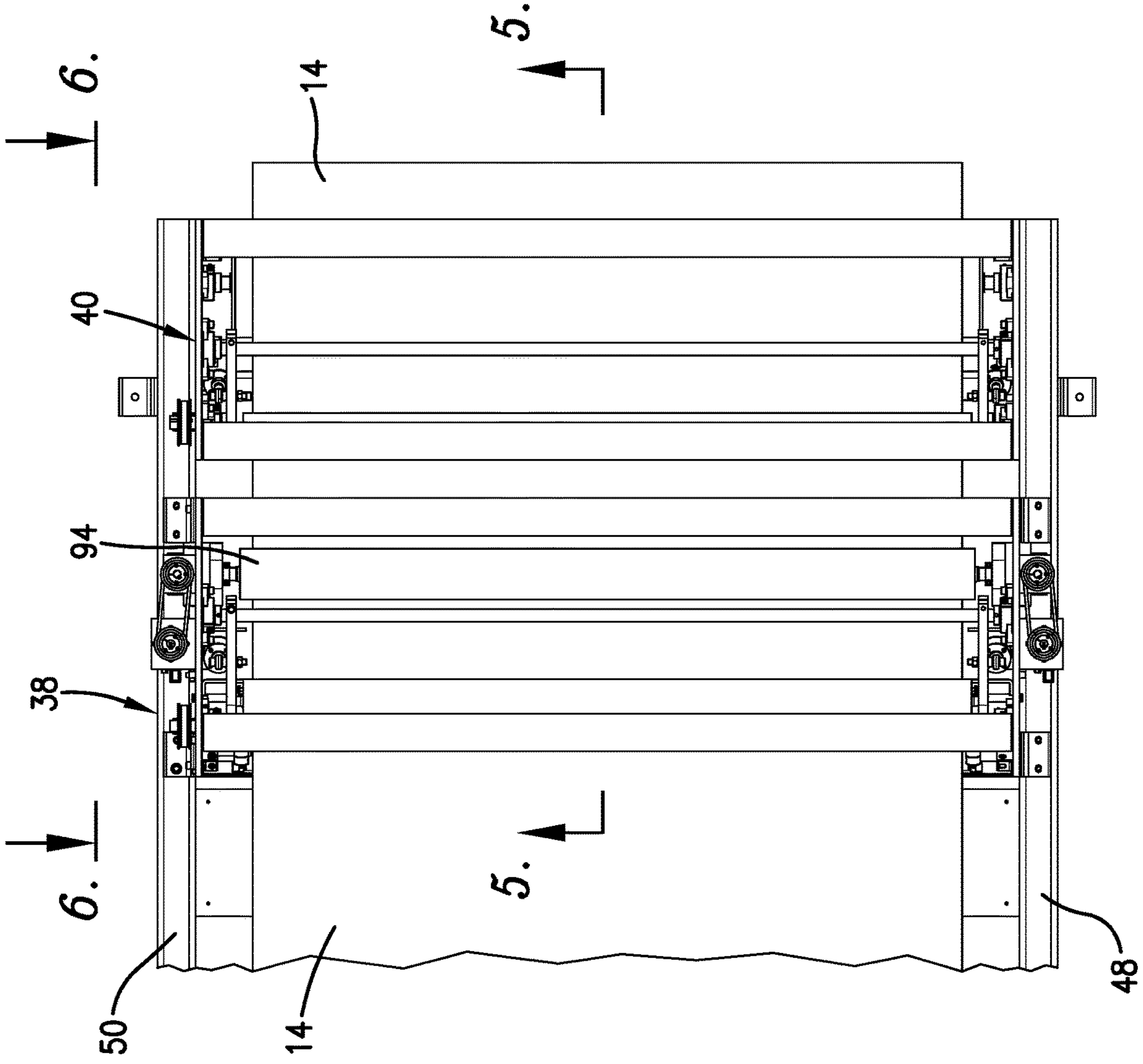
FIG. 4 is a top view of a portion of the decurling station of FIG. 2.

Turning to FIG. 1, a system 10 constructed in accordance with an embodiment of the invention is illustrated. The system 10 is configured to form pressware products 12 from a web 14 of a roll of material 16. The pressware products 12 may include plates, bowls, trays, or the like. The material 16 may comprise paper, polystyrene, recycled paper, vegetable or organic matter, cotton, bamboo, or the like. The roll of material 16 may have a diameter 18 or radius 20 (depicted in FIG. 2).

Figure 27:
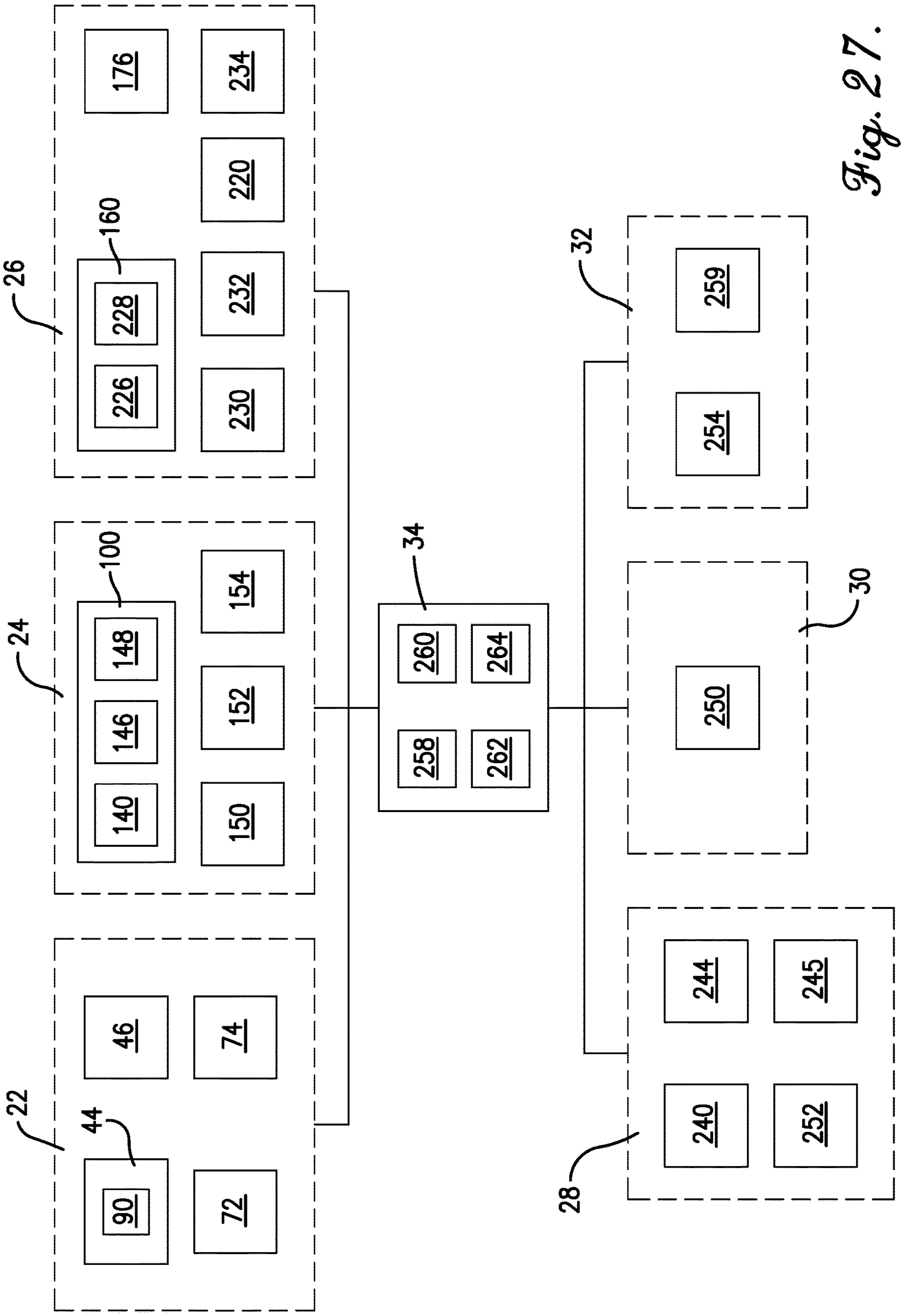
FIG. 27 is a block diagram depicting selected components of the system of FIG. 1.

An embodiment of the system 10 may comprise a decurling station 22, a scoring station 24, a forming station 26, a picking station 28, a stacking station 30, a chopping station 32, and a control system 34 (schematically depicted in FIG. 27). Turning to FIGS. 2-6, the decurling station 22 is configured to pull the web 14 along a path with an angle 43. The decurling station 22 may include a frame 36, a pair of pull roller assemblies 38, 40, a decurl roller 42, a decurling station actuator 44, and a sensor 46 (schematically depicted in FIG. 27). The frame 36 may support one or more rolls of material 16, the pull roller assemblies 38, 40, the decurl roller 42, and the decurling station actuator 44. The frame 36 may include a pair of top rails 48, 50 and pairs of support walls 52, 54, 56, 58 extending vertically from the top rails 48, 50. One or more rolls 16 may be rotatably mounted to the frame 36 via mounts 60, which may be horizontally movable along the rails 48, 50. The support walls 52, 54, 56, 58 may support the assemblies 38, 40, the decurl roller 42, and the decurling station actuator 44. Particularly, support walls 52, 54 may support the first pull roller assembly 38, the decurl roller 42, and the decurling station actuator 44 while the support walls 56, 58 support the second pull roller assembly 40.

Figure 5:
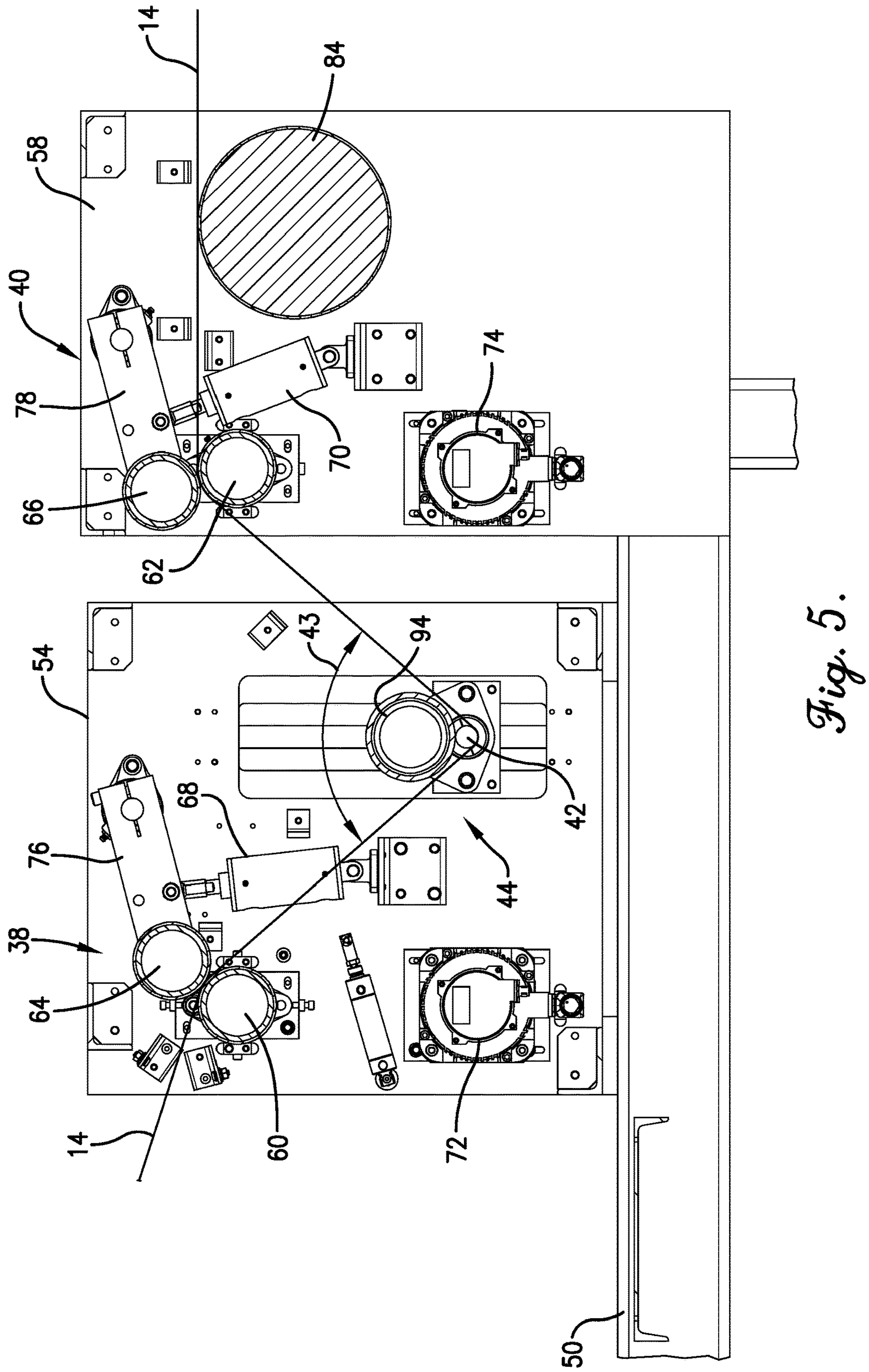
FIG. 5 is a sectional view of the decurling station of FIG. 4 along lines 5-5.

Turning to FIG. 5, each of the assemblies 38, 40 may include a pull roller 60, 62, a pinch roller 64, 66, a biasing element 68, 70, and a drive motor 72, 74. The pull rollers 60, 62 may be rotatably mounted to their respective support walls 52, 54, 56, 58 and driven by their respective motors 72, 74 to pull the web 14 from the roll 16. The pinch rollers 64, 66 may be biased toward the pull rollers 60, 62 via their respective biasing elements 68, 70 to enable the pull rollers 60, 62 to grip the web 14. In some embodiments, the pinch rollers 64, 66 may be rotatably mounted to arms 76, 78, which are in turn pivotally mounted to their respective support walls 52, 54, 56, 58 so that they are operable to pivot toward the pull rollers 60, 62. The biasing elements 68, 70 may be connected to the arms 76, 78 and bias the arms 76, 78 and therefore the pinch rollers 64, 66 against their respective pull rollers 60, 62. The biasing elements 68, 70 may comprise springs, pneumatic cylinders, or the like.

Figure 6:
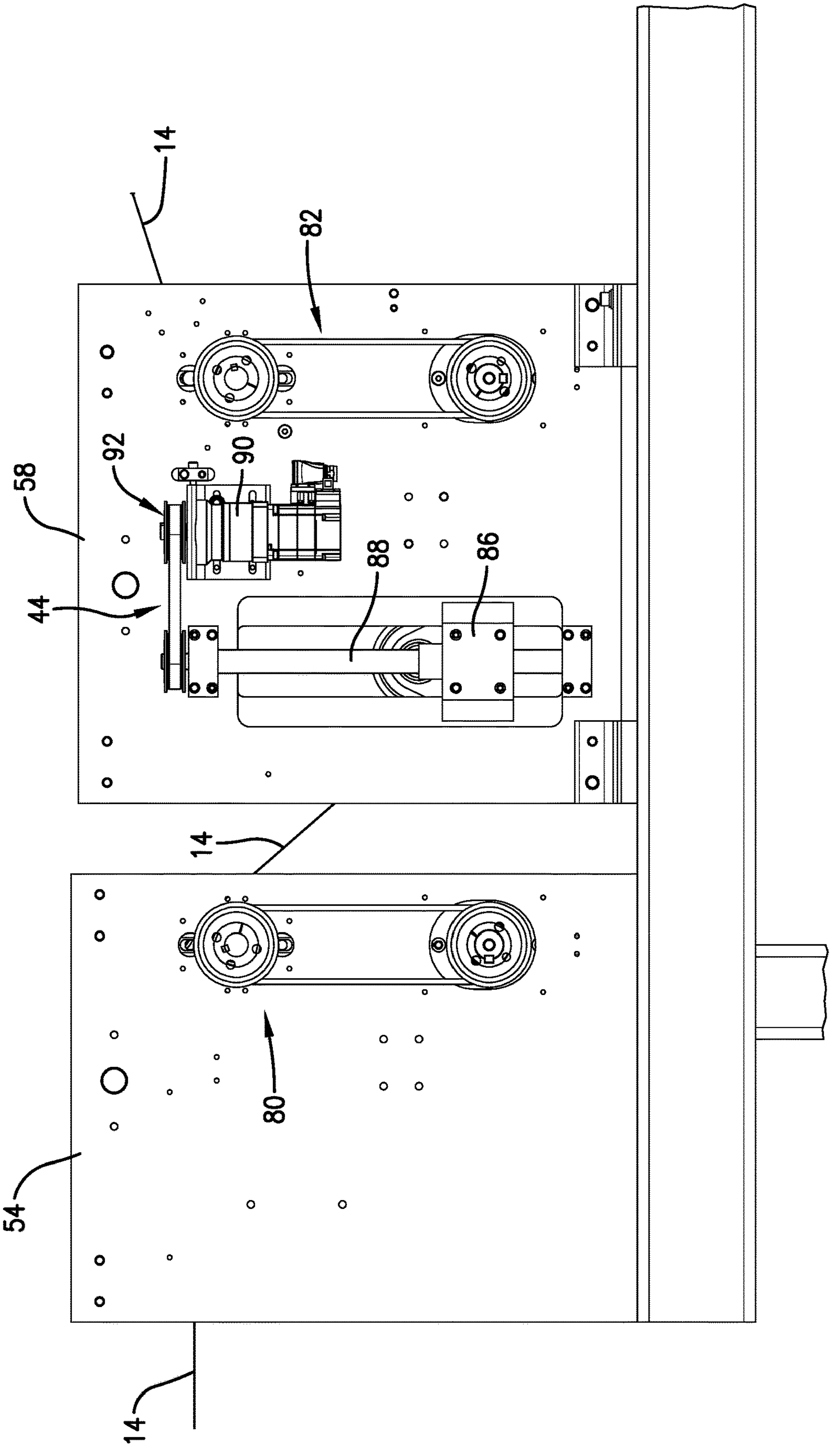
FIG. 6 is a sectional view of the decurling station of FIG. 4 along lines 6-6.

Turning to FIG. 6, the drive motors 72, 74 are configured to drive the pull rollers 60, 62 to pull the web 14 from the roll 16. The motors 72, 74 may drive the pull rollers 60, 62 via belt and pulley systems 80, 82. However, the motors 72, 74 may drive the rollers 60, 62 any number of ways without departing from the scope of the present invention. For example, the motors 72, 74 may directly drive their respective pull rollers 60, 62. In some embodiments, a single motor may be used to drive both rollers 60, 62 synchronously. The second assembly 40 may include an exit roller 84 for supporting the decurled web 14 as it exits the decurling station 22 (as depicted in FIG. 5).

Turning back to FIG. 5, the decurl roller 42 is shiftable to change the angle 43 of the path through which the web 14 is pulled to counteract the intrinsic curling of the web 14. The decurl roller 42 may be rotatable so that it rotates as the web 14 is pulled through the path. As depicted, the decurl roller 42 may be positioned between the pull roller assemblies 38, 40 and may be vertically shiftable to increase or decrease the angle 43. The decurling station actuator 44 may be configured to shift the decurl roller 42 to affect the angle 43 of the path. As used herein, an "actuator" may comprise any device or machine known in the art to achieve physical movements, including linear actuators, electrical actuators, hydraulic actuators, pneumatic actuators, electric motors, rotary actuators, piezoelectric actuators, or the like. The decurling station actuator 44 may be configured to shift the decurl roller 42 so that the angle 43 is obtuse at the top most position and acute at the lowermost position. The decurling station actuator 44 may include a nut 86 supporting the decurl roller 42, a spindle 88 rotatably secured to the support wall 58, and a servo motor 90 that drives the spindle 88. The nut 86 may be rotatably coupled to the spindle 88 and shiftable on the support wall 58. The servo motor 90 may drive the spindle 88, or cause it to rotate, via a pulley and belt system 92. The nut 86 and spindle 88 may have threads that cause the nut 86 to travel along the spindle 88 as it rotates to shift the decurl roller 42.

The decurl roller 42 and the rollers 60, 62 may be arranged any number of ways to pull the web 14 through the path to decurl the web 14 without departing from the scope of the present invention. Further, the decurl roller 42 may be configured to be shifted in any number of directions to affect the angle 43 of the path of the web 14 without departing from the scope of the present invention. In some embodiments, the decurling station 22 may include a support roller 94 positioned above the decurl roller 42 and also rotatably supported on the nut 86 so that it shifts with the decurl roller 42.

The sensor 46 is configured to sense a characteristic of the roll 16 and generate sensor data based on the characteristic. The characteristic may be a weight of the roll 16, the diameter 18, the radius 20, a distance between an outer surface 47 (shown in FIG. 3) of the roll 16 and the sensor 46 (which may be indicative of the diameter 18 or radius 20), or the like. The sensor 46 may comprise a distance measuring device, such as a laser distance sensor, a load cell, or the like. The sensor 46 is configured to send a signal representative of the sensor data to the control system 34.

Figure 7:
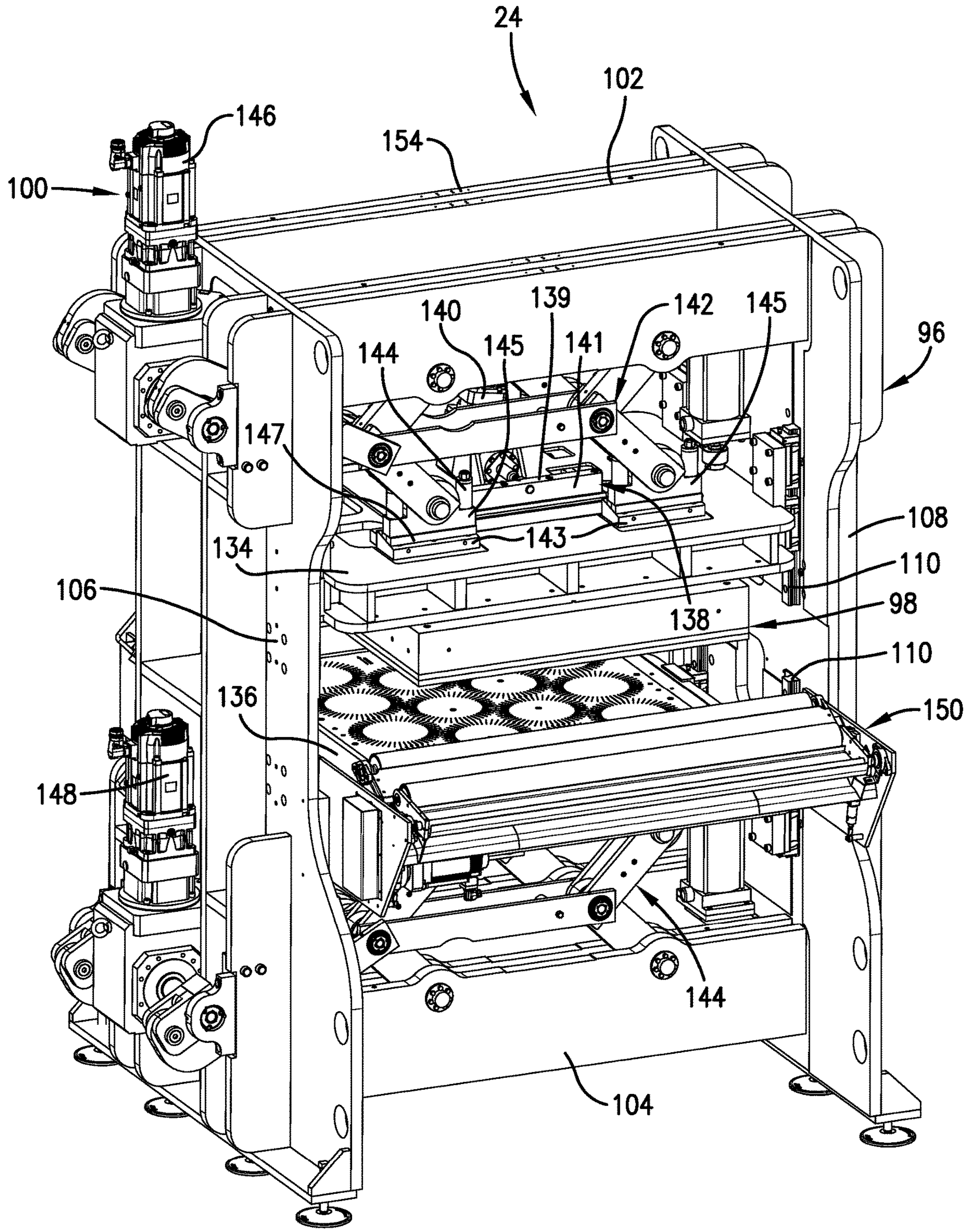
FIG. 7 is a perspective view of a scoring station of the system of FIG. 1.

Turning to FIG. 7, the scoring station 24 scores the web 14 in preparation of forming the products 12. The scoring station 24 comprises a scoring station frame 96, a scoring tool 98, and a scoring station actuator 100. The scoring station frame 96 is configured to support the scoring tool 98 and the scoring station actuator 100. The frame 96 may include an upper gantry 102, a lower gantry 104, and upright supports 106, 108. The gantries 102, 104 support different portions of the scoring tool 98 and the scoring station actuator 100. The upright supports 106, 108 support the gantries 102, 104 and may include one or more tracks 110 for guiding the scoring tool 98 and or portions of the actuator 100.

Figure 8:
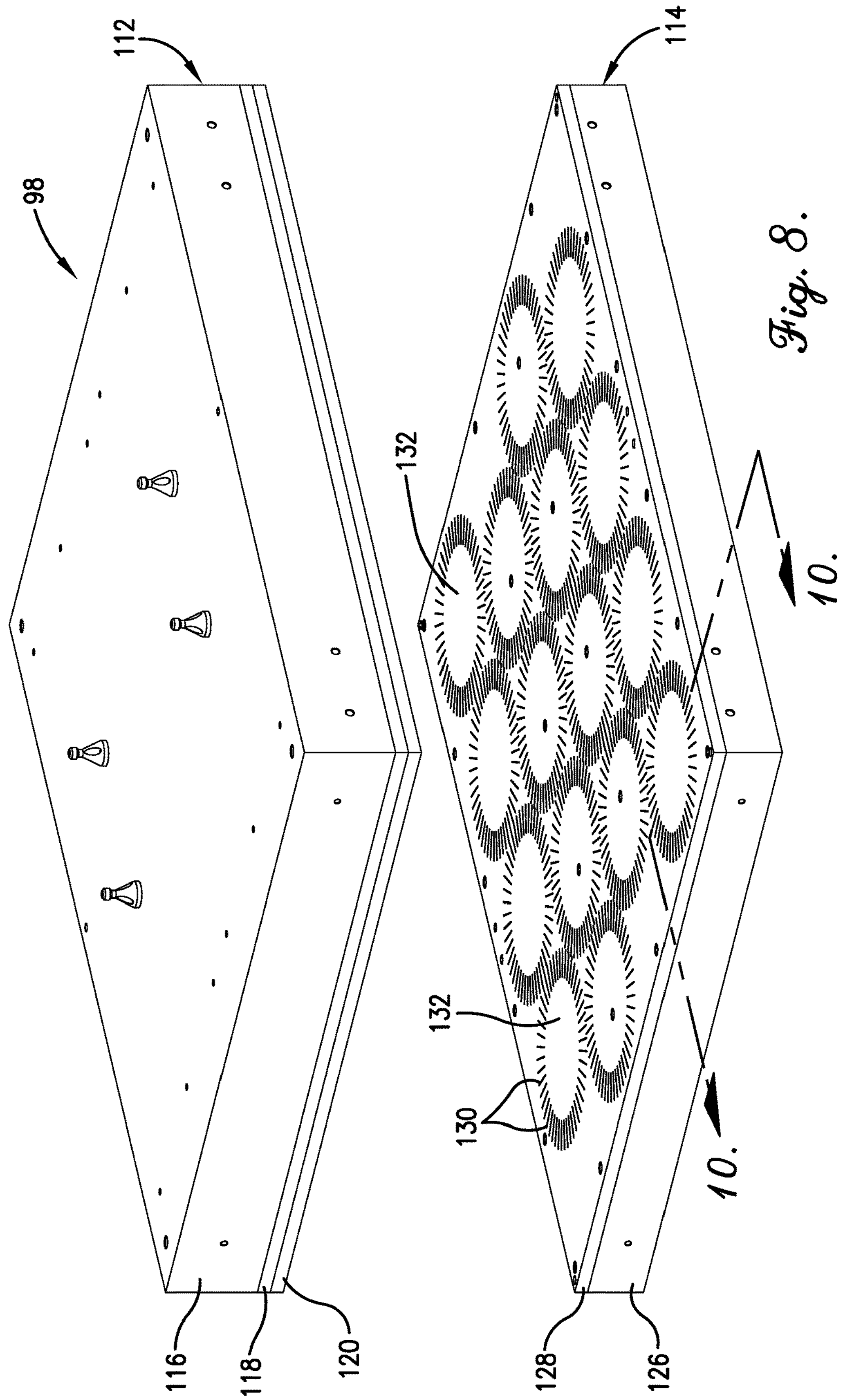
FIG. 8 is an elevated perspective view of a scoring tool of the scoring station of FIG. 7.
Figure 9:
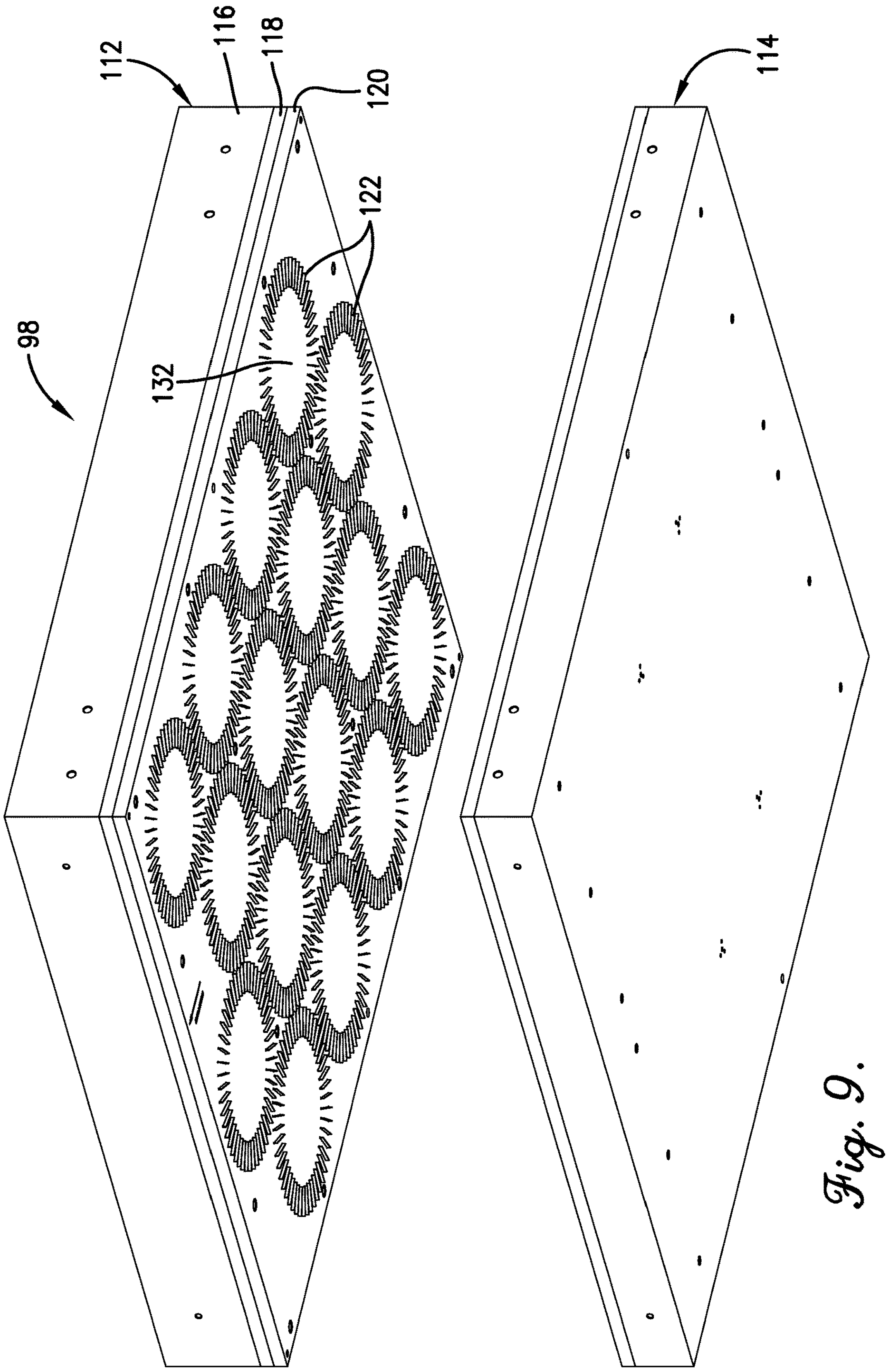
FIG. 9 is a lowered perspective view of the scoring tool of the scoring station of FIG. 7.
Figure 10:
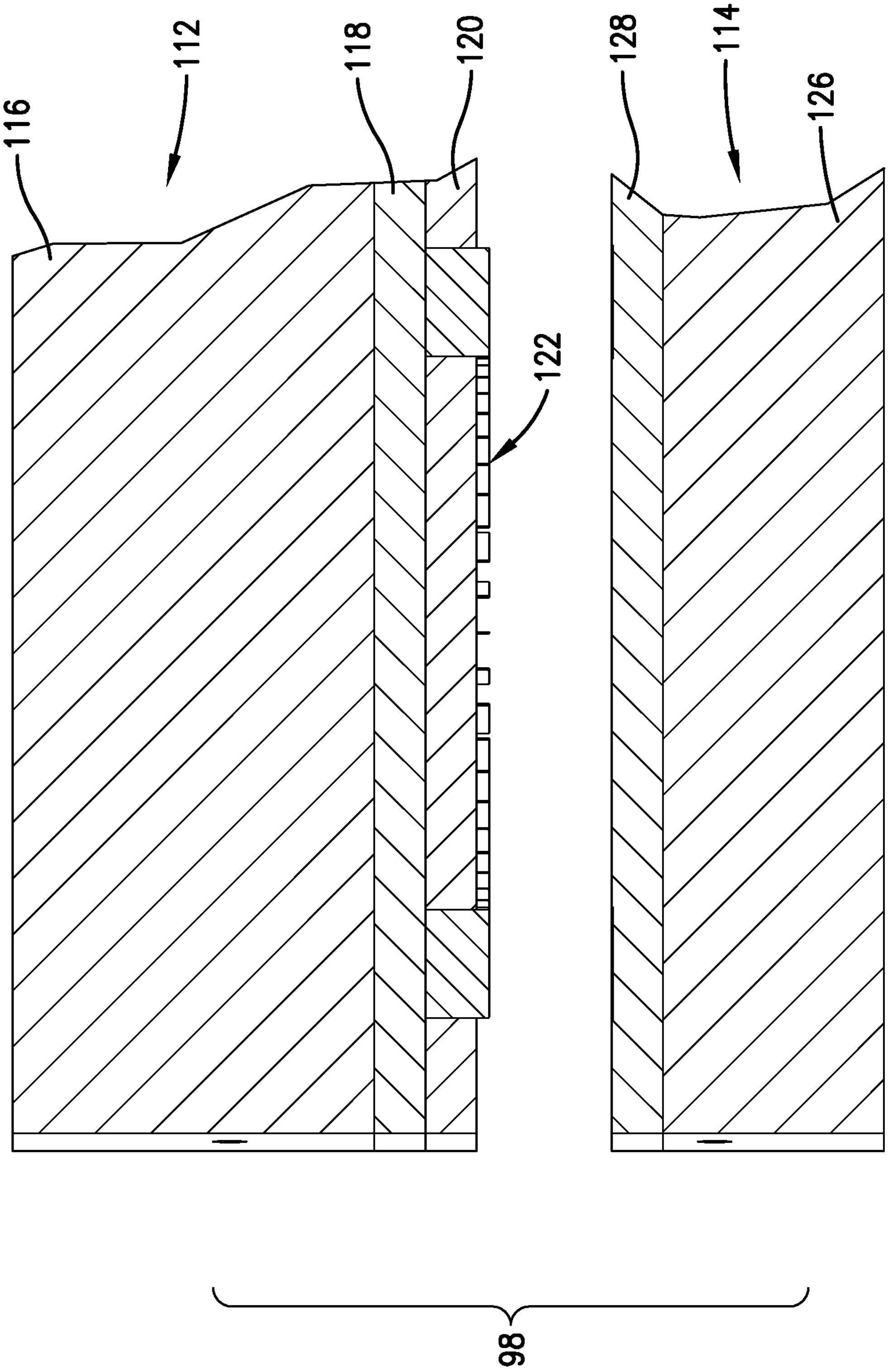
FIG. 10 is a sectional view of the scoring tool of FIG. 8 along lines 10-10.

Turning to FIG. 8, the scoring tool 98 is configured to be pressed against the web 14 to score the web 14. The scoring tool 98 may include a top tool 112 and a bottom tool 114. As depicted in FIGS. 9 and 10, the top tool 112 may include a top die plate 116, a punch backing plate 118 secured to the top die plate 116, a punch holder 120 secured to the punch backing plate 118, and a plurality of scoring punches 122 secured by the punch holder 120. The punches 122 include blades 124 that extend beyond the punch holder 120 and are operable to impart slots in the web 14.

Figure 11:
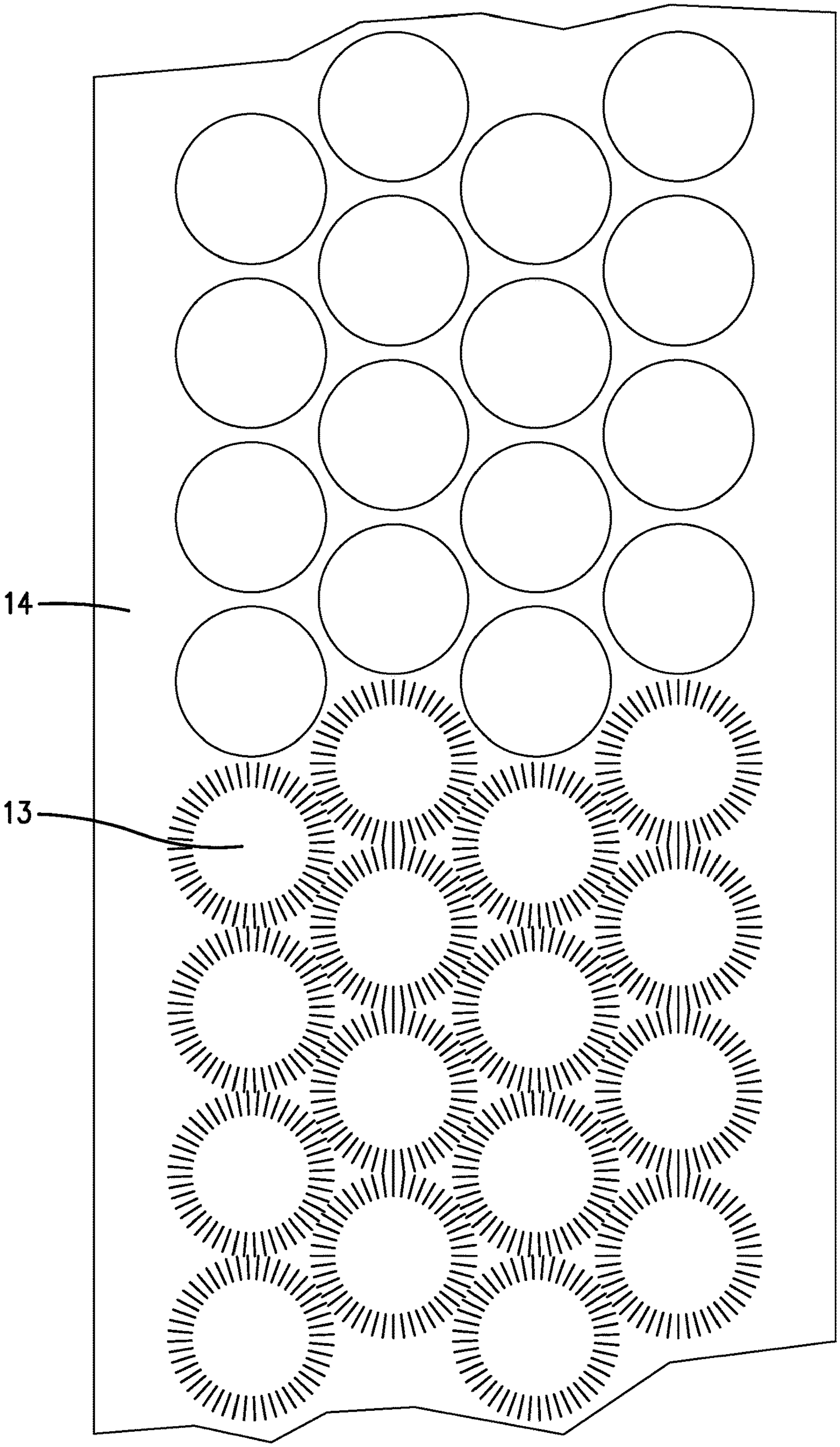
FIG. 11 is a top view of a web of material depicting exemplary scores and holes formed by the system of FIG. 1.

The bottom tool 114 may include a bottom die plate 126 and a striker plate 128 secured to the bottom die plate 126, as depicted in FIG. 10. The striker plate 128 may include a plurality of scoring slots 130 (shown in FIG. 8) that are complementary to the blades 124 of the top tool 112. The punches 122 and their blades 124 and the corresponding slots 130 may extend about a shape 132 representing an outline of the pressware products 12, as shown in FIGS. 8 and 9. The punches 122 and slots 130 may extend radially away from the shape 132. However, the punches 122 and slots 130 may extend along the outline of the shape 132 any number of ways without departing from the scope of the present invention. Further, the punches 122 may be pointed to impart holes instead of slots without departing from the scope of the present invention. There may be any number of punches 122 for producing any number of slots about the shape 132 without departing from the scope of the present invention. Further, the punches 122 may only extend about a portion of the shape 132. There also may be any number of punches 122 and slots 130 extending about any number of shapes 132 for scoring any number of pressware products 12 without departing from the scope of the present invention. In some embodiments, the scoring tool 98 may include punches 122 and corresponding slots 130 for scoring sixteen pressware products 12 in a single stroke of the tool 98. However, the scoring tool 98 may include punches 122 and slots 130 for scoring any number of products 12 without departing from the scope of the present invention. Further, the scoring tool 98 may score any type of shape 132, the same shapes 132, or different shapes 132 without departing from the scope of the present invention. FIG. 11 depicts an exemplary web 14 scored for forming the pressware products 12 from the scored shapes 13.

Figure 26:
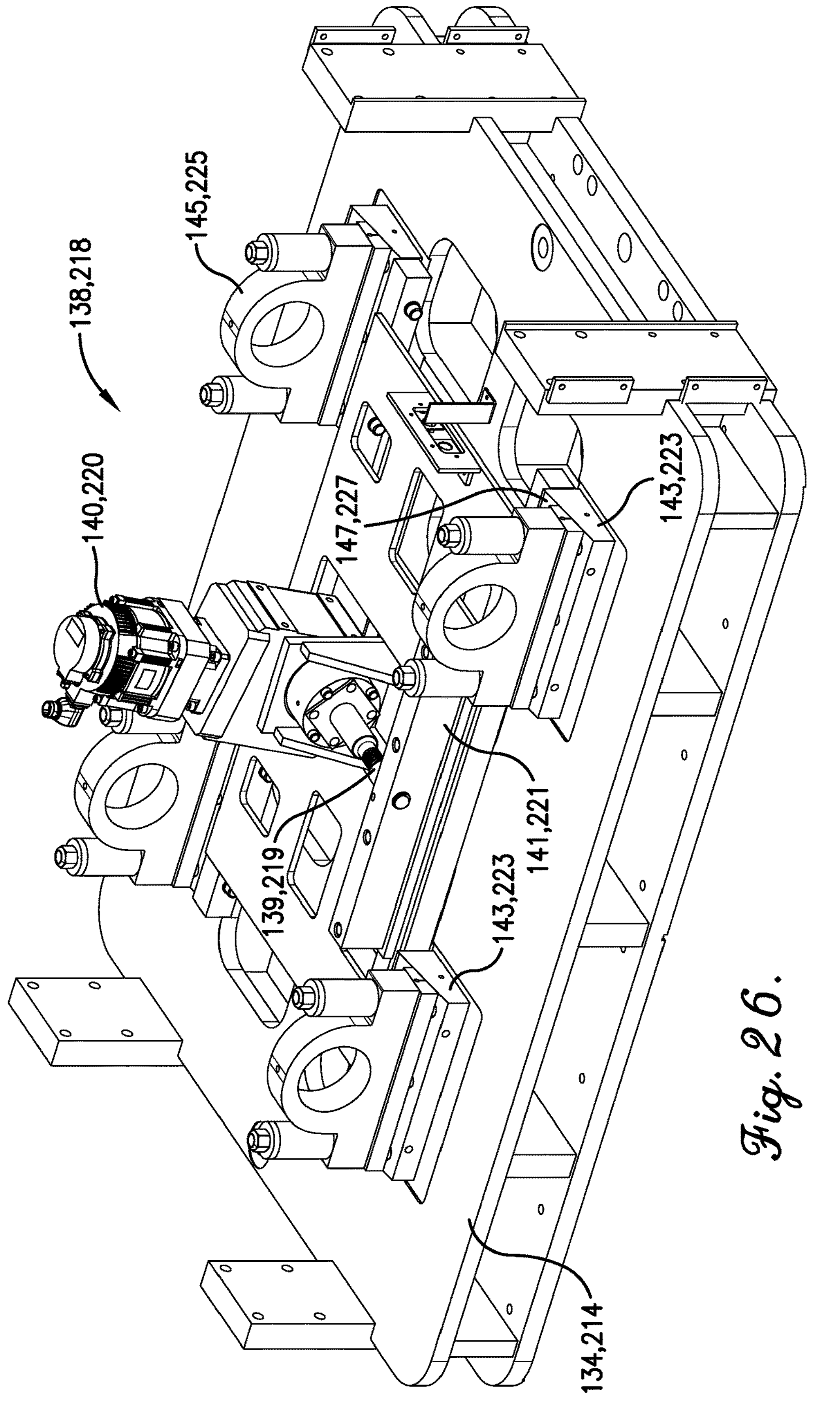
FIG. 26 is a perspective view of an exemplary height adjustment assembly of the scoring station and forming station of the system of FIG. 1.

Turning back to FIG. 7, the scoring station actuator 100 is configured to shift the scoring tool 98 and may include a top platen 134, a bottom platen 136, a height adjust assembly 138, a height adjust servo motor 140, an upper toggle assembly 142, a lower toggle assembly 144, a top platen servo drive 146, and a bottom platen servo drive 148. The top tool 112 may be secured to the top platen 134 which is vertically shiftable along the tracks 110 of the frame 96. The bottom tool 114 may be secured to the bottom platen 136 and also vertically shiftable and guided by the tracks 110. The top platen 134 may be secured to the height adjust assembly 138 for providing adjustments to the scoring depth of the punches 122. Turning briefly to FIG. 26, the height adjust assembly 138 may be driven by the height adjust servo motor 140. The height adjust assembly 138 may in turn be secured to the upper toggle assembly 142 which is operable to shift to move the top platen 134. The height adjust assembly 138 may include a lead screw 139, a wedge drive plate 141, and wedge sets 143. The lead screw 139 may be driven by the servo motor 140 and configured to push the wedge drive plate 141 against the wedge sets 143 to adjust the scoring depth of the tool 98. The scoring depth may be associated with a thickness of the web 14. The wedge sets 143 may be positioned between toggle bearing blocks 145 (connected to the upper toggle assembly 142) and the top platen 134. The wedge sets 143 may have an angled surface 147 that increases the distance between the bearing blocks 145 and the top platen 134 as the wedge sets 143 are pushed by the wedge drive plate 141. The toggle bearing blocks 145 may be biased against the wedge sets 143 via die springs 149.

Turning back to FIG. 7, the bottom platen 136 may be secured to the lower toggle assembly 144 which is operable to shift to move the bottom platen 136. The upper toggle assembly 142 may be driven by the top platen servo drive 146, and the lower toggle assembly 144 may be driven by the bottom platen servo drive 148. While FIG. 7 depicts the height adjust assembly 138 and corresponding motor 140 shifting the top platen 134 relative to the upper toggle assembly 142, the height adjust assembly 138 and corresponding motor 140 may shift the bottom platen 136 relative to the lower toggle assembly 144 without departing from the scope of the present invention. Further, the actuator 100 may actuate the tool 98 any number of ways without departing from the scope of the present invention. For example, the actuator 100 may shift only the upper tool 112 or alternatively only shift the bottom tool 114.

In some embodiments, the scoring station 24 may further include one or more indexers 150, 152 (indexer 152 is depicted in FIG. 1) for guiding and directing the web 14 through the station 24. The scoring station 24 may also include one or more force sensors 154 for detecting a force applied to the web 14 by the scoring tool 98.

Figure 12:
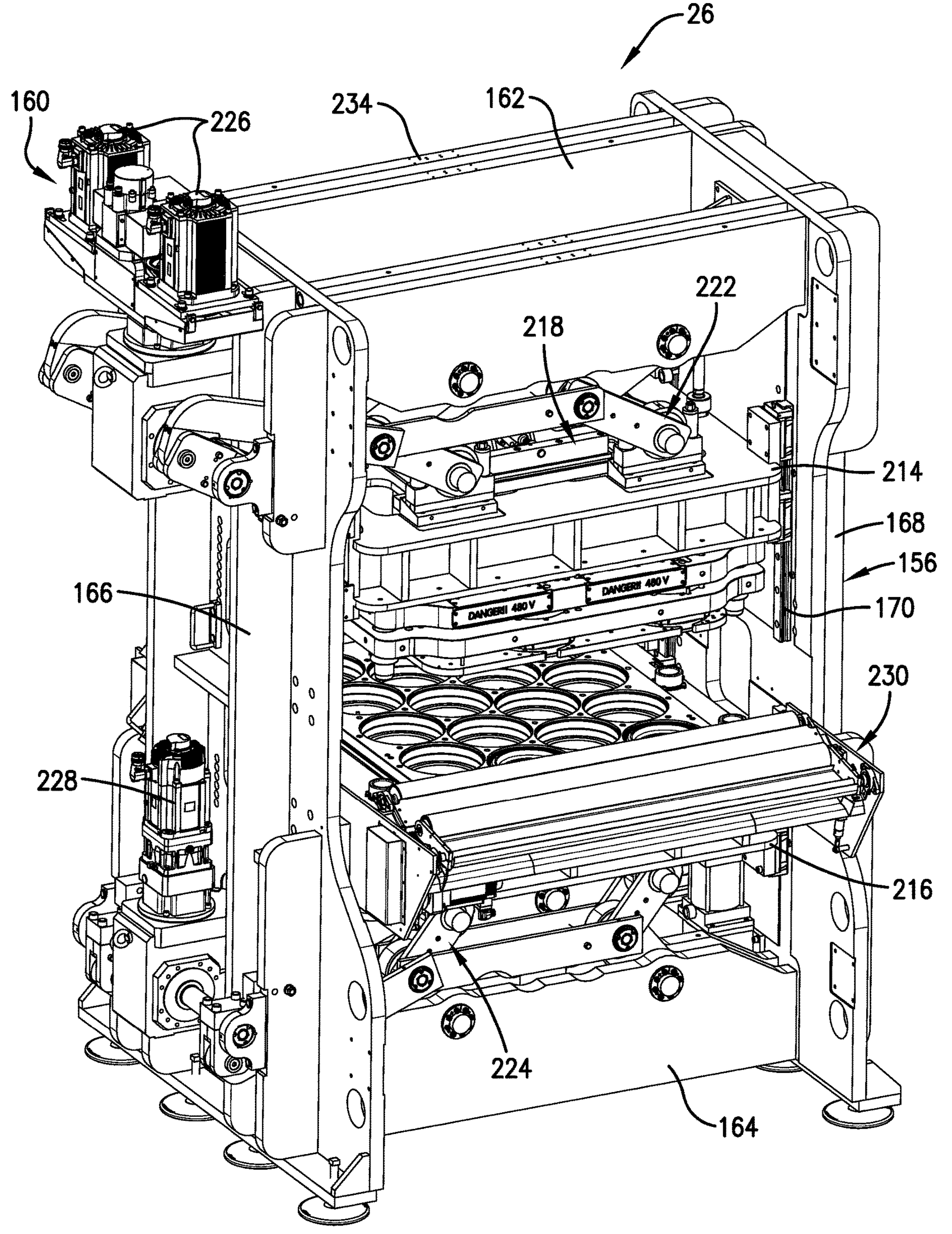
FIG. 12 is a perspective view of a forming station of the system of FIG. 1.

Turning to FIG. 12, the forming station 26 is configured to punch the scored shapes 13 out of the web 14 and form the products 12. The forming station 26 may comprise a forming station frame 156, a forming tool 158, and a forming station actuator 160. The forming station frame 156 is configured to support the forming tool 158 and the forming station actuator 160. The frame 156 may include an upper gantry 162 and a lower gantry 164 for supporting different portions of the forming tool 158 and the forming station actuator 160 and upright supports 166, 168 for supporting the gantries 162, 164. The upright supports 166, 168 may include one or more tracks 170 for guiding the forming tool 158 and or portions of the actuator 160.

Figure 13:
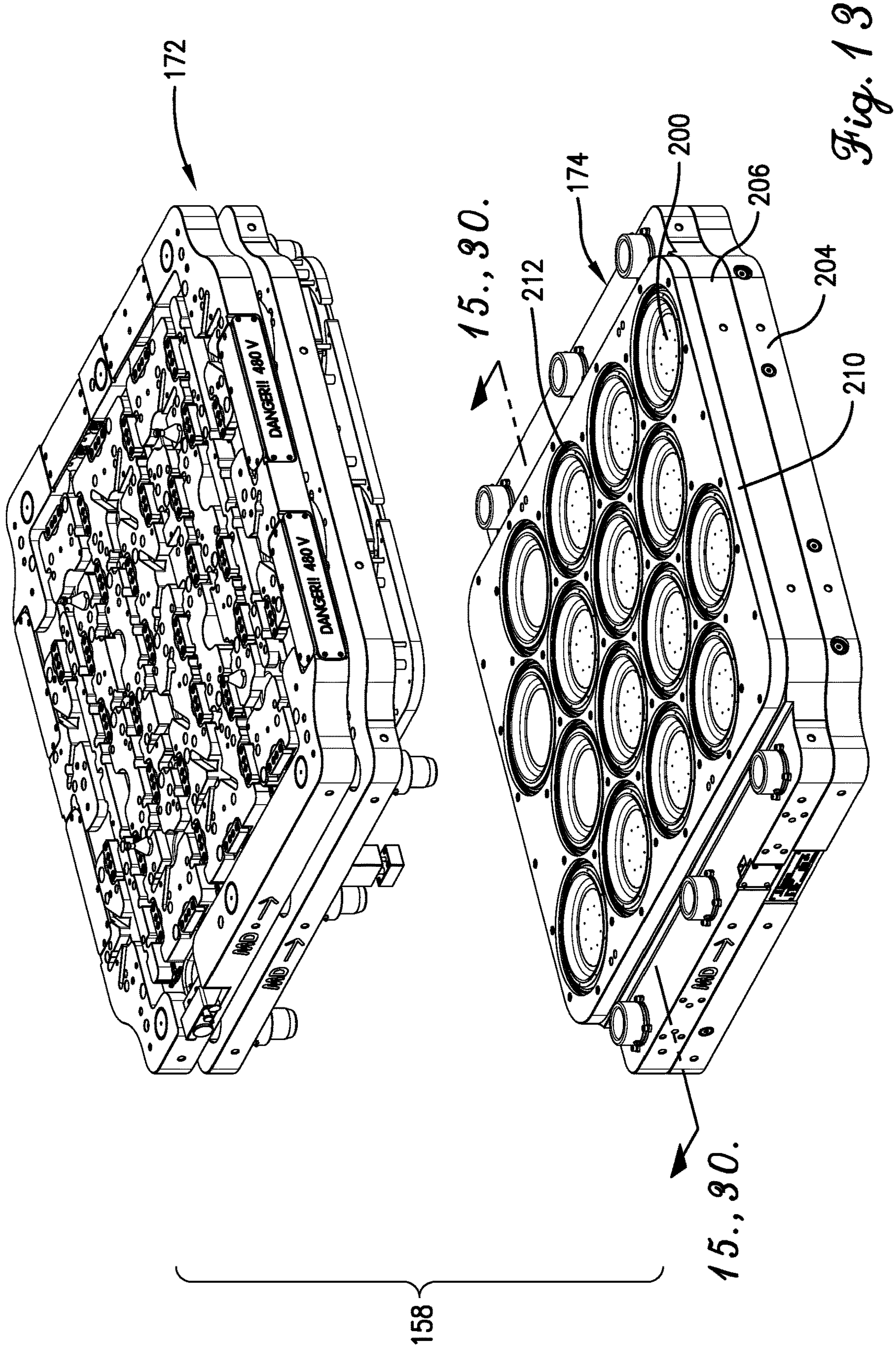
FIG. 13 is an elevated perspective view of a forming tool of the forming station of FIG. 12 with molds having draw rings.
Figure 14:
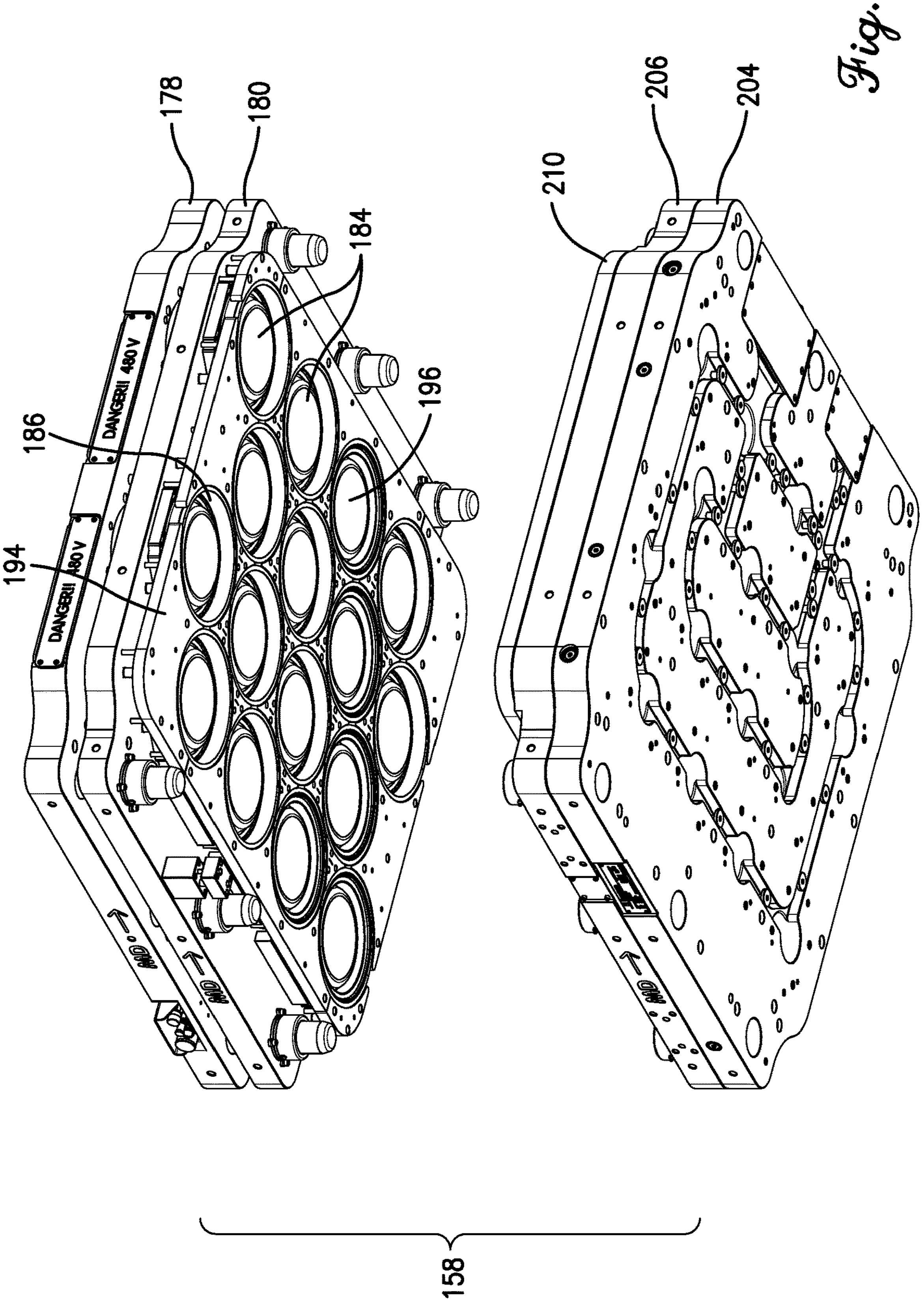
FIG. 14 is a lowered perspective view of the forming tool of FIG. 13.
Figure 15:
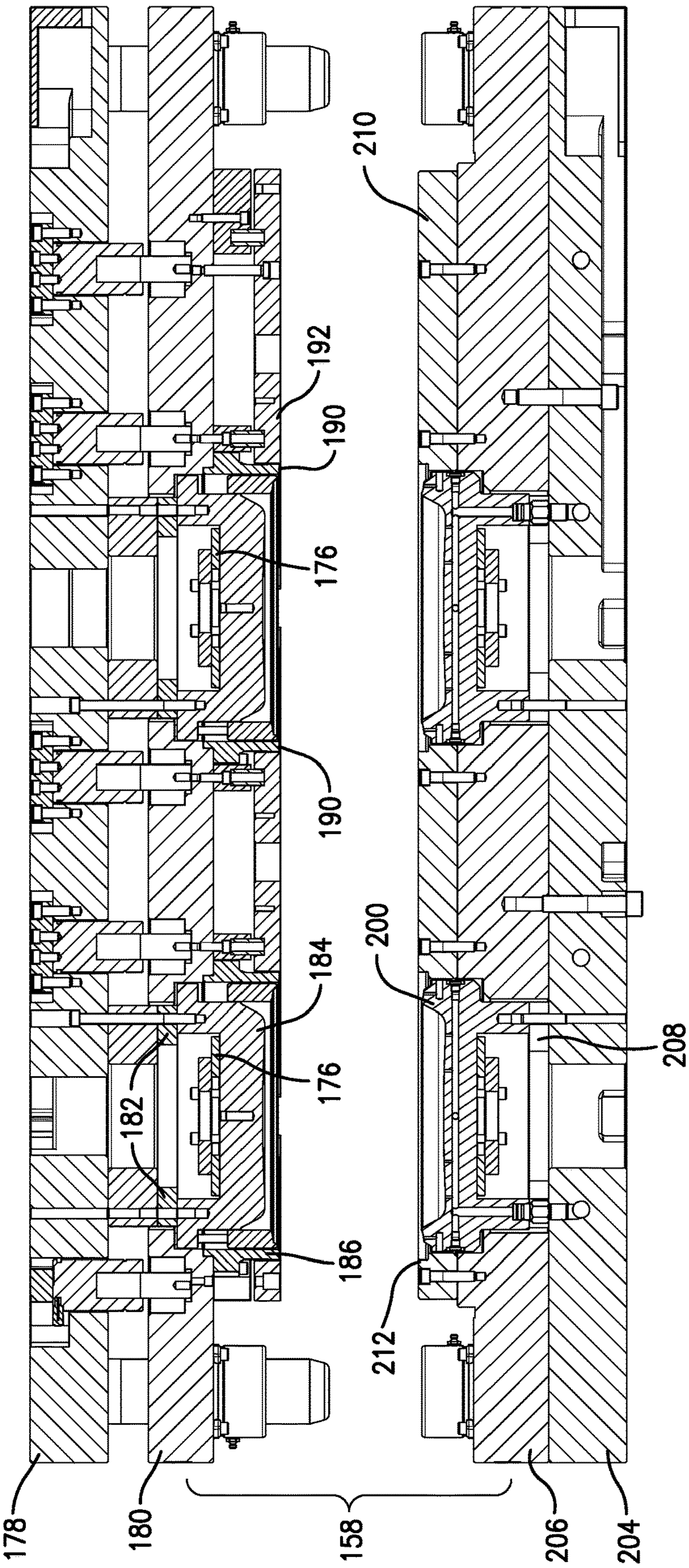
FIG. 15 is a sectional view of the forming tool of FIG. 13 along lines 15-15.
Figure 16A:
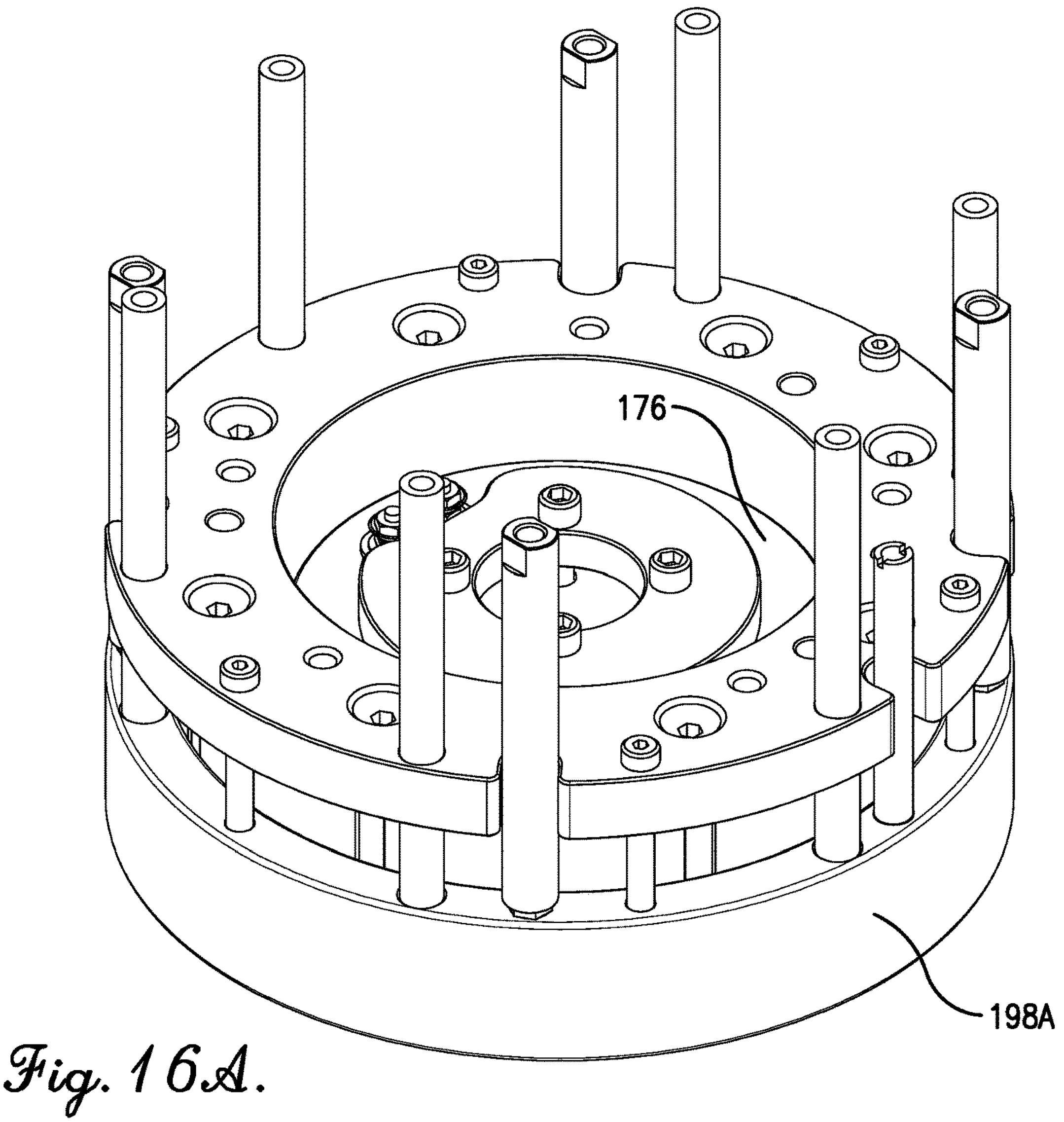
FIG. 16A is a perspective view of a positive mold of the forming tool of FIG. 13.
Figure 16B:
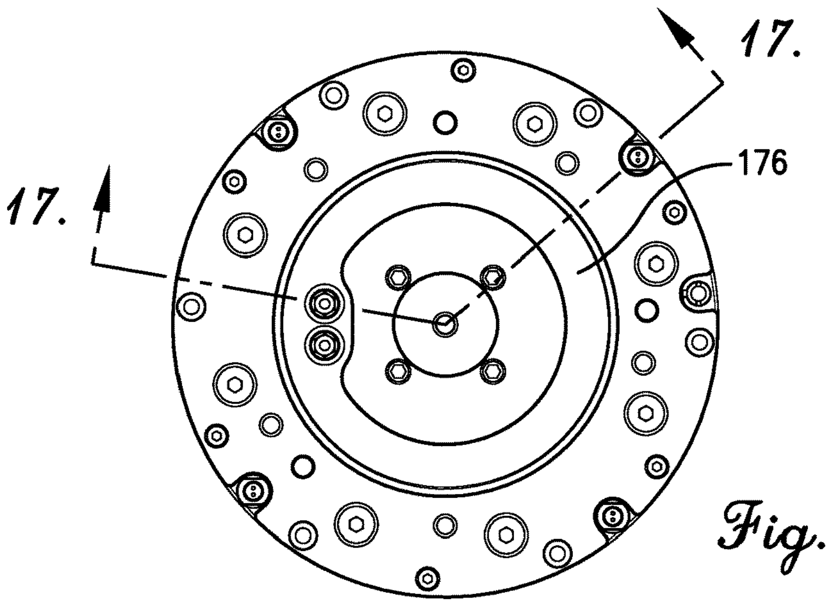
FIG. 16B is a top view of the positive mold of FIG. 16A.
Figure 17:
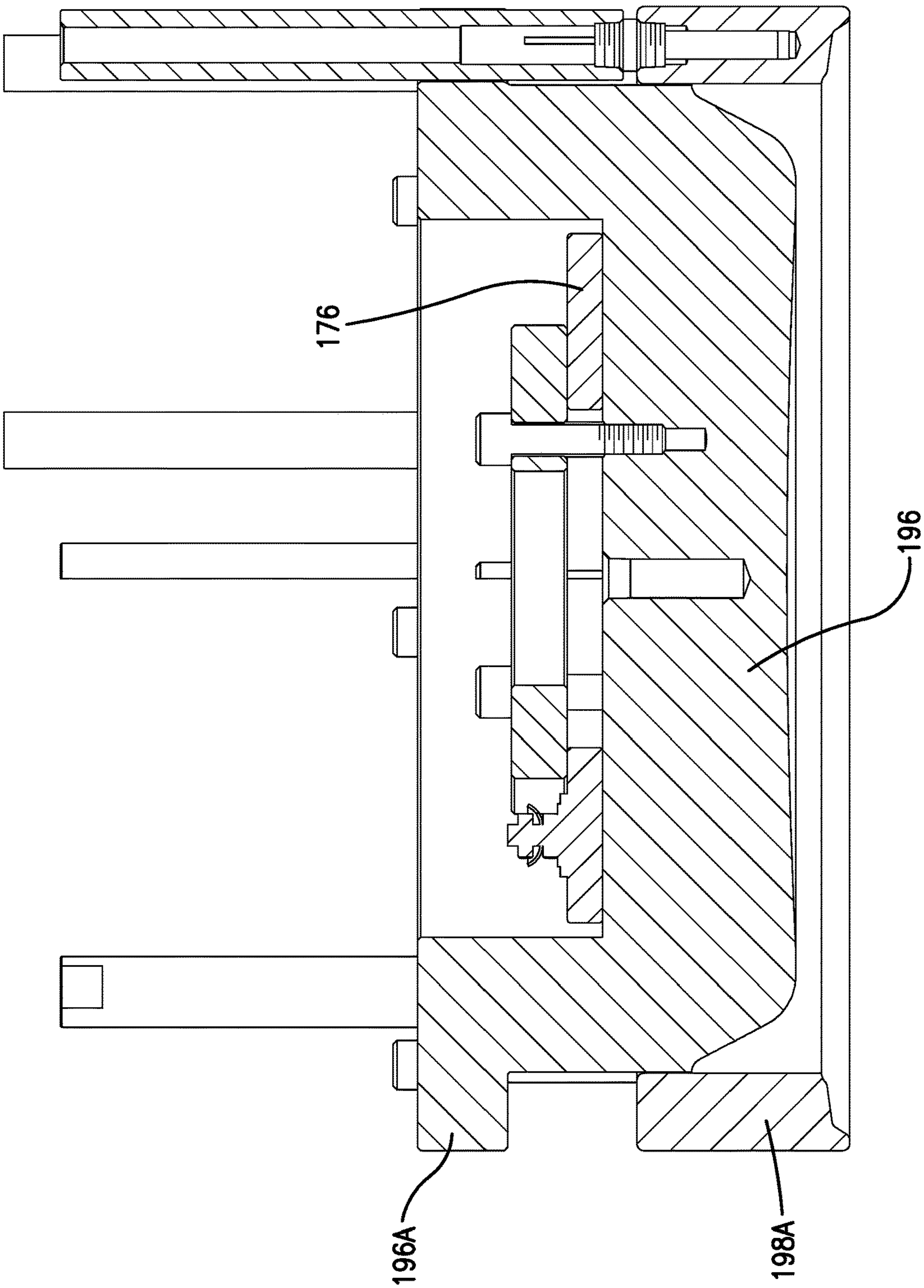
FIG. 17 is a sectional view of the positive mold of FIG. 16B.
Figure 18:
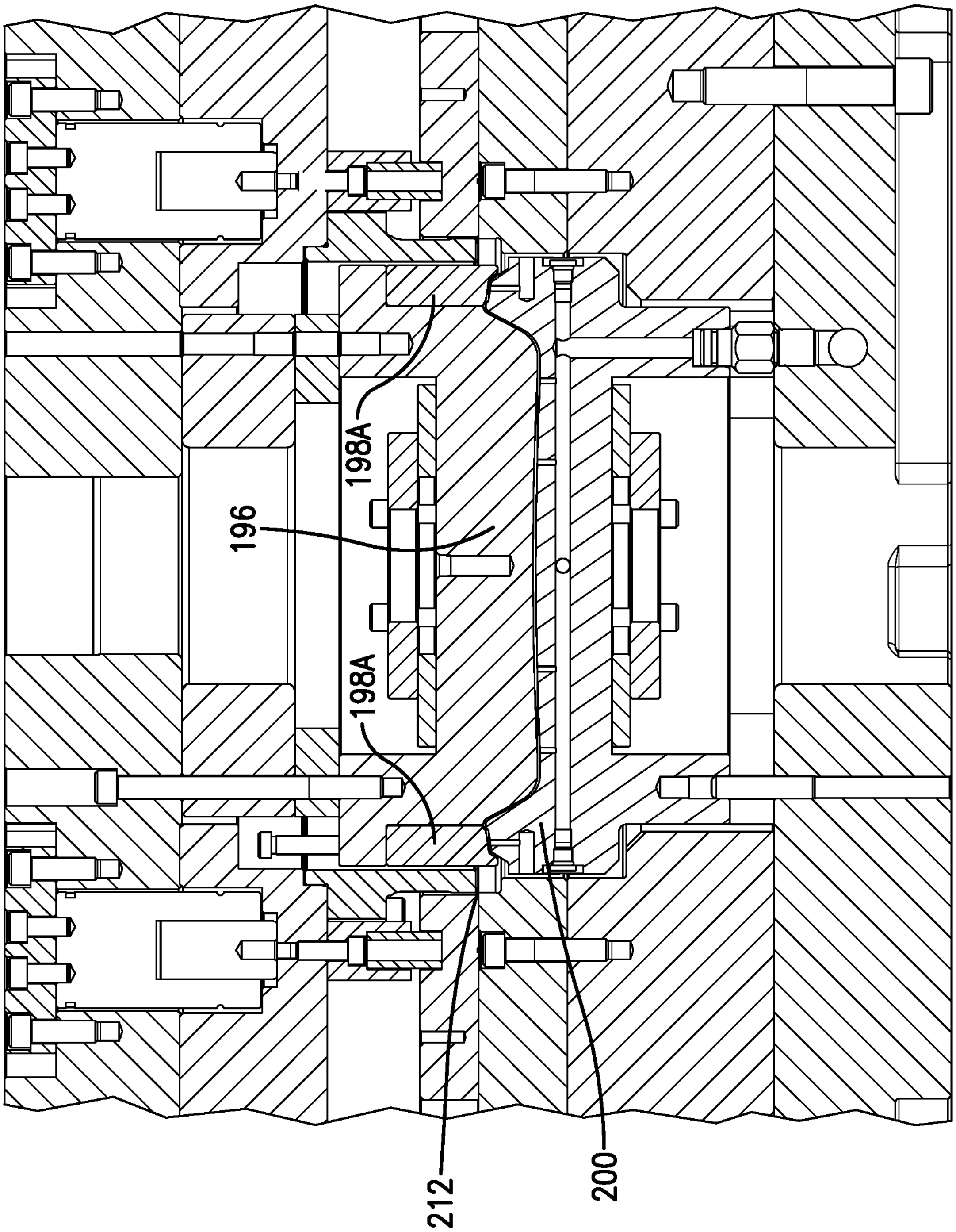
FIG. 18 is an enlarged view of the forming tool of FIG. 15 with the positive mold extending into a corresponding negative mold.
Figure 19:
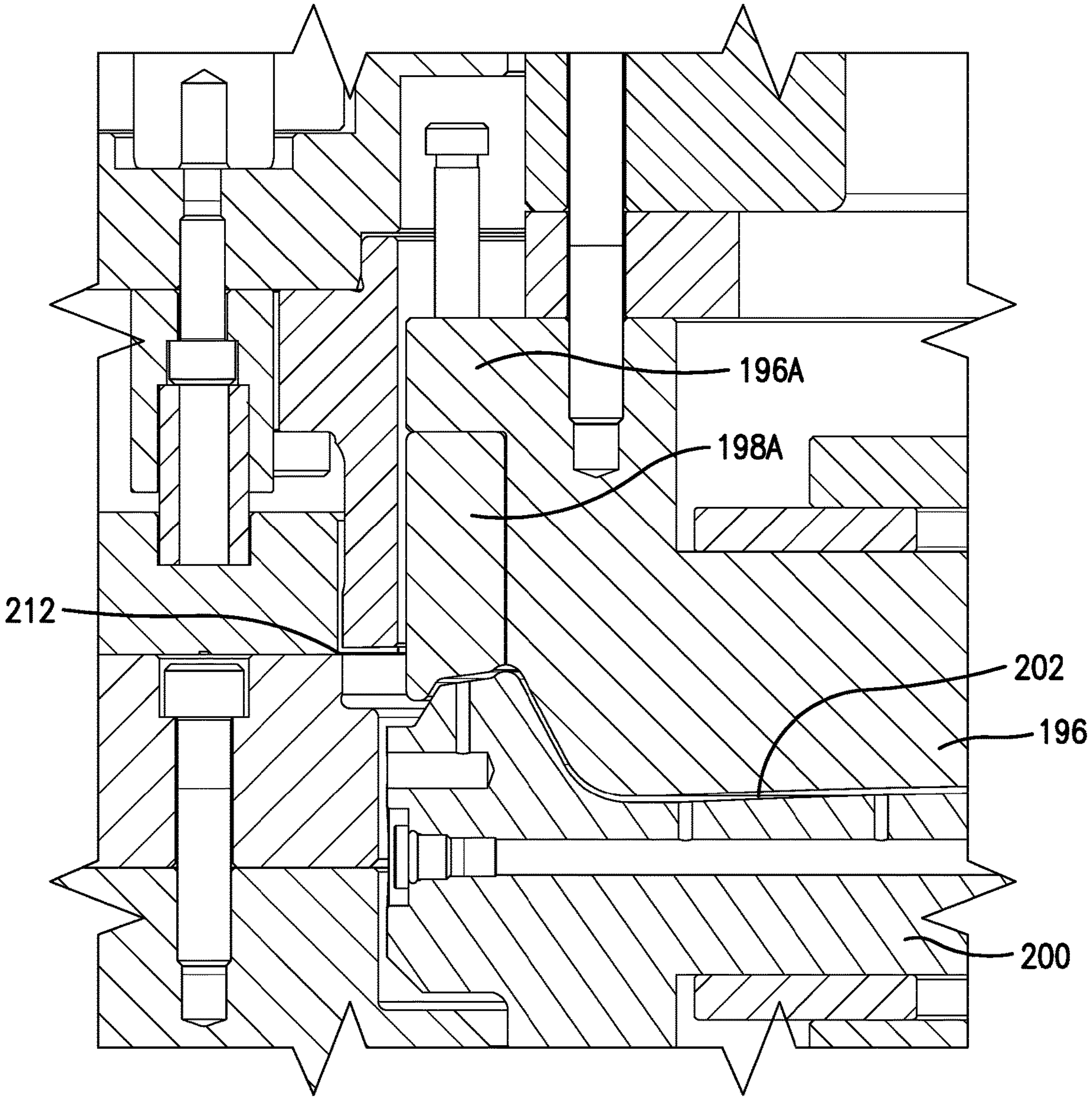
FIG. 19 is an enlarged view of portions of the positive mold and the negative mold of FIG. 18.
Figure 20:
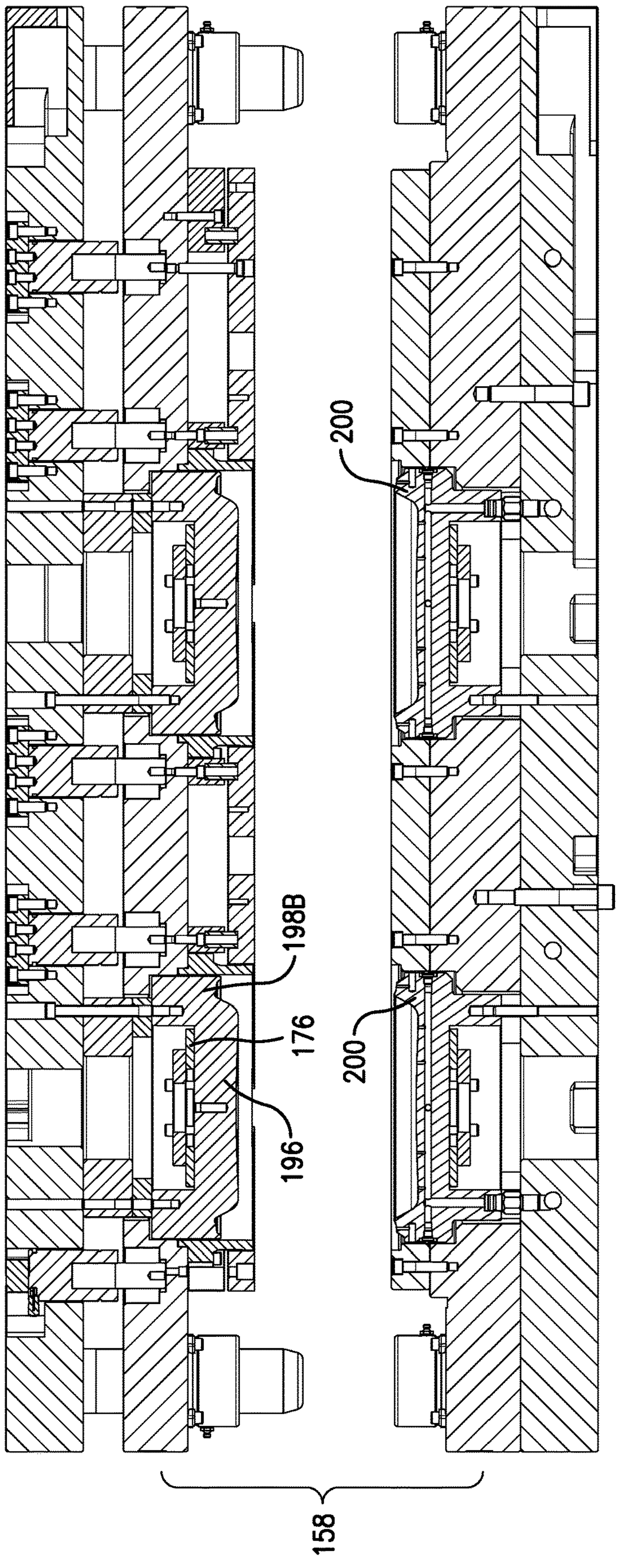
FIG. 20 is a sectional view of the forming tool of FIG. 13 along lines 15-15 with positive molds constructed according to another embodiment of the present invention.
Figure 21:
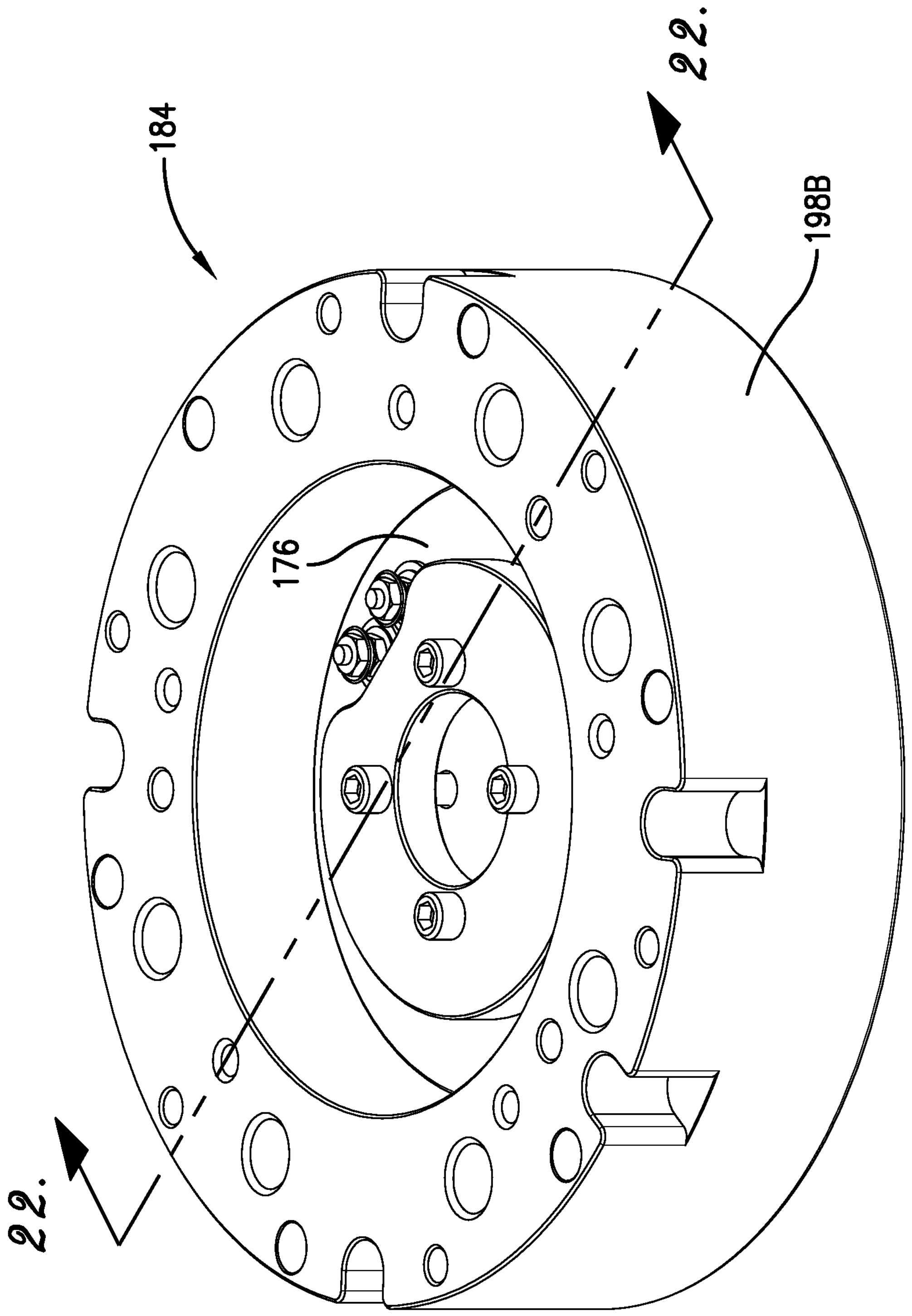
FIG. 21 is a perspective view of one of the positive molds of the forming tool of FIG. 20.
Figure 22:
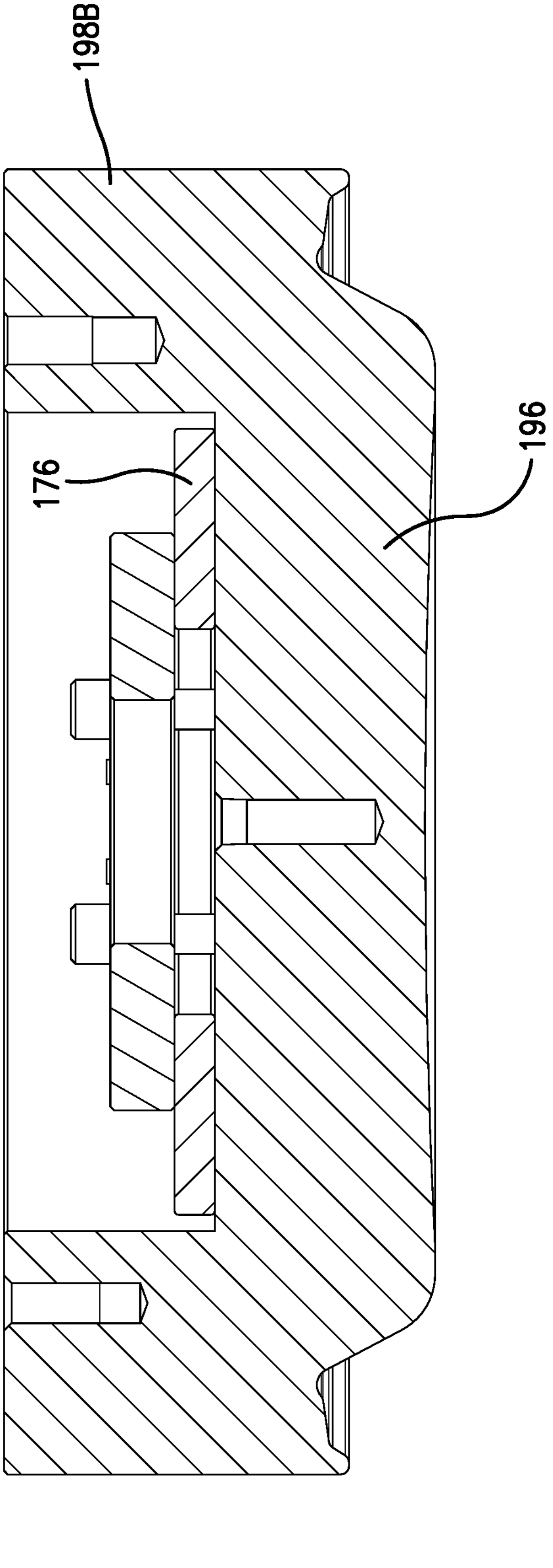
FIG. 22 is a sectional view of the positive mold of FIG. 21 along lines 22-22.
Figure 23:
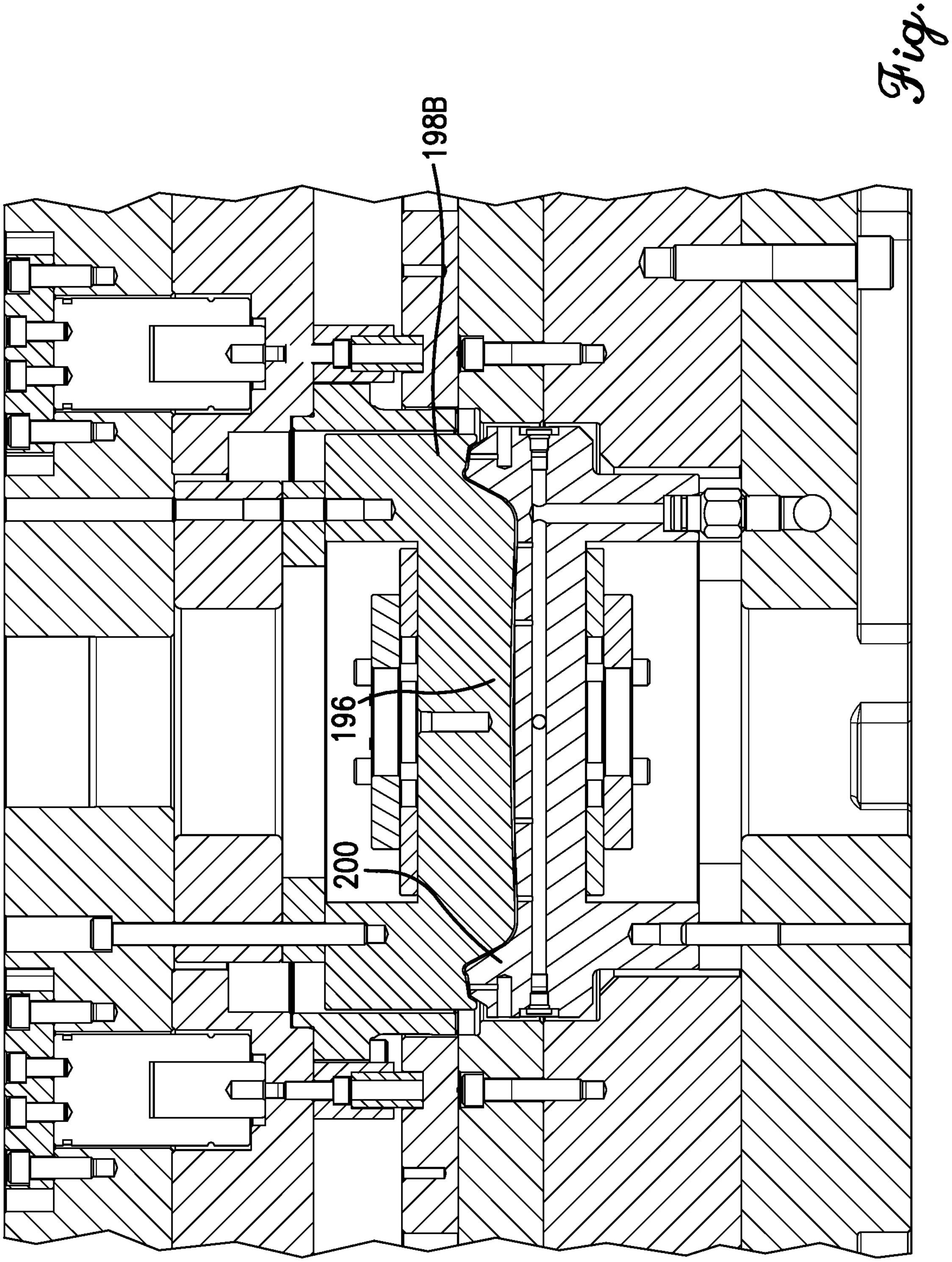
FIG. 23 is a sectional view of the forming tool of FIG. 20 with the positive mold extending into a corresponding negative mold.
Figure 24:
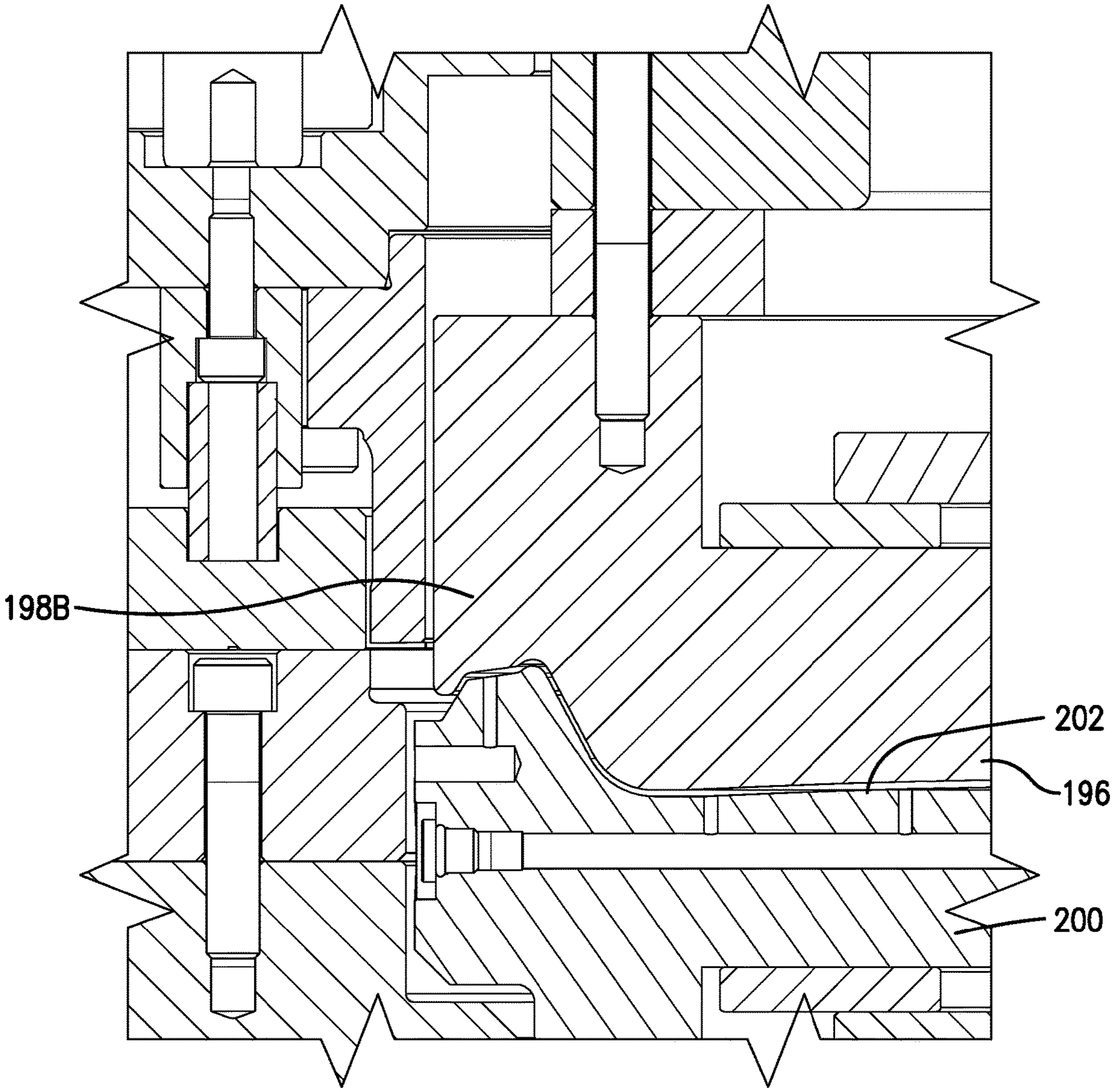
FIG. 24 is an enlarged view of portions of the positive mold and the negative mold of FIG. 23.

Turning to FIG. 13, the forming tool 158 is configured to be actuated to punch out the scored shapes 13 and form the products 12. The forming tool 158 may include a positive mold assembly 172, a negative mold assembly 174, and heating elements 176. As depicted in FIGS. 14 and 15, the top tool 172 may include a positive mold shoe 178, a punch shoe 180, an insulator plate 182 (shown in FIG. 15), a plurality of molds 184, and a plurality of punches 186. The positive mold shoe 178 supports the plurality of molds 184, and the punch shoe 180 supports the punches 186. Some of the heating elements 176 may be positioned on and secured to the molds 184, and particularly to the top surfaces of the molds 184, to heat the molds 184 and in turn heat the web 14 to form the products 12. The insulator plate 182 may be positioned above the heated molds 184 to insulate portions of the positive mold assembly 172 from the heated molds 184.

The molds 184 include bottom surfaces 188 for forming top surfaces of the products 12. The molds 184 of the positive mold assembly 172 may include central portions 196 and annular portions 198A,B. Turning to FIGS. 15-19, in some embodiments, the annular portions 198A may be draw rings that are shiftable relative to the central portions 196. The central portions 196 may include flanges 196A that push down on the draw rings 198A to compress the rim of the products 12 to increase the rigidity of the rim of the products 12. However, the temperatures of the draw rings 198A and the central portions 196 need to be monitored and regulated to avoid thermal expansion issues (such as friction, scraping, wearing, and jamming) between the shifting draw rings 198A and the central portions 196. Thus, in some embodiments, to enable higher forming temperatures of the products 12, the molds 184 may include annular portions 198B that are integral to the central portions 196, as depicted in FIGS. 20-24.

The punches 186 include edges 190 configured to cut the shapes 13 from the web 14 along the slots. The forming tool 158 may include nitrogen gas springs 187 configured to help press the punches 186 against the web 14. The positive mold assembly 172 may also include a trim stripper 194 for pushing the scrap web 15 (discussed further below) away from the positive mold assembly 172.

Turning to FIGS. 13-15, the negative mold assembly 174 may include negative molds 200 with top surfaces 202 for forming bottom surfaces of the pressware products 12, a negative mold shoe 204, a die shoe 206, an insulator plate 208, and a trim die 210. The negative molds 200 may be complementary to the positive molds 184 and may be secured to the negative mold shoe 204. The die shoe 206 may be secured to the negative mold shoe 204, and the trim die 210 may secured to the die shoe 206. The trim die 210 may include edges 212 that pinch the web 14 with the punches 186 of the positive mold assembly 172 to remove the products 12 from the web 14. Some of the heating elements 176 may also be secured to the bottom surfaces of the negative molds 200 to heat the molds 200 and in turn help heat the web 14 to form the products 12. The insulator plate 208 may be positioned below the heated molds 200 to insulate portions of the negative mold assembly 174 from the heated molds 200.

Turning back to FIG. 12, the forming station actuator 160 is configured to actuate the forming tool 158 and may include a top platen 214, a bottom platen 216, a height adjust assembly 218, a height adjust servo motor 220 (depicted in FIG. 26), an upper toggle assembly 222, a lower toggle assembly 224, a top platen servo drive 226, and a bottom platen servo drive 228. The positive mold assembly 172 may be secured to the top platen 214 which is vertically shiftable and guided by the tracks 170 of the frame 156. The negative mold assembly 174 may be secured to the bottom platen 216 and also vertically shiftable and guided by the tracks 170. The top platen 214 may be secured to the height adjust assembly 218 for providing adjustments to the depth of the molds 184.

The height adjust assembly 218 may be driven by the height adjust servo motor 220. The height adjust assembly 218 and its height adjust servo motor 220 may be substantially similar to the height adjust assembly 138 and motor 140 of the scoring station 24. As depicted in FIG. 26, the height adjust assembly 218 may include a lead screw 219, a wedge drive plate 221, and wedge sets 223. The lead screw 219 may be driven by the servo motor 220 and configured to push the wedge drive plate 221 against the wedge sets 223 to adjust the scoring depth of the tool 158. The wedge sets 223 may be positioned between toggle bearing blocks 225 (connected to the upper toggle assembly 222) and the top platen 214. The wedge sets 223 may have an angled surface 227 that increases the distance between the bearing blocks 225 and the top platen 214 as the wedge sets 223 are pushed by the wedge drive plate 221. The toggle bearing blocks 225 may be biased against the wedge sets 223 via die springs 229. The height adjust assembly 218 may in turn be secured to the upper toggle assembly 224 which is operable to shift to move the top platen 214.

The bottom platen 216 may be secured to the lower toggle assembly 224 which is operable to shift to move the bottom platen 216. The upper toggle assembly 222 may be driven by the top platen servo drive 226, and the lower toggle assembly 224 may be driven by the bottom platen servo drive 228. While FIG. 12 depicts the height adjust assembly 218 and corresponding motor 220 shifting the top platen 214 relative to the upper toggle assembly 222, the height adjust assembly 218 and corresponding motor 220 may shift the bottom platen 216 relative to the lower toggle assembly 224 without departing from the scope of the present invention.

In some embodiments, the forming station 26 may further include one or more indexers 230, 232 (indexer 232 shown in FIG. 1) for guiding and directing the web 14 and scrap web 15 through the forming station 26. The forming station 26 may include one or more force sensors 234 for detecting a force applied to the web 14 by the forming tool 158.

Figure 25A:
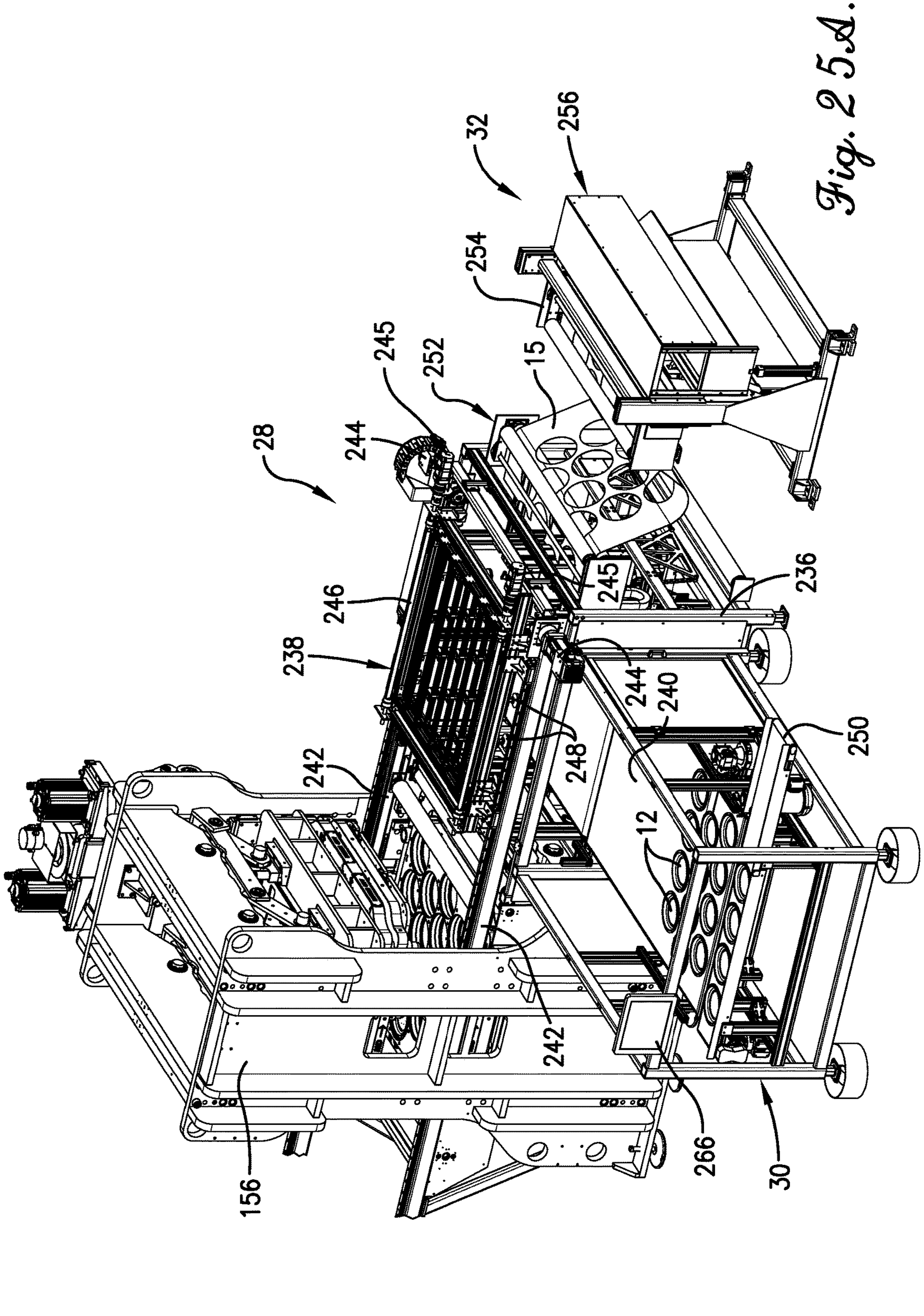
FIG. 25A is a perspective view of a picking station, stacking station, and chopping station of the system of FIG. 1.

Turning to FIG. 25A, the picking station 28 is configured to pick the products 12 from the bottom molds 200. The picking station 28 may include a frame 236, a vacuum cup extractor assembly 238, and a conveyor 240. The frame 236 may be adjacent to the forming station 26 so that the picking station 28 receives scrap web 15 from the forming station 26 and can access the products 12 formed at the forming station 26.

The vacuum cup extractor assembly 238 may be supported on the frame 236 and include tracks 242, actuators 244, 245 a shiftable frame 246, and a plurality of vacuum cups 248. The tracks 242 may be secured to the frame 236 and extend onto the frame 156 of the forming station 26. The actuators 244 are configured to move the shiftable frame 246 along the tracks 242 to shift the frame 246 above the negative mold assembly 174 of the forming station 26 and back to the frame 236 of the picking station 28. The actuators 245 are configured to lower the frame 246 so that the vacuum cups 248 engage the products 12. The shiftable frame 246 supports the plurality of vacuum cups 248 as it shifts along the tracks 242. The frame 236 and/or the vacuum cups 248 may be vertically shiftable so that the cups 248 can move toward the negative mold assembly 174 to engage the products 12, pull the products 12 up out of the molds 200, and move them above the conveyor 240. The vacuum cups 248 may be configured to releasably hold the products 12.

The conveyor 240 may be positioned below the tracks 242 on the frame 236 and be configured to transport the products 12 dropped by the vacuum cup extractor assembly 238 to the stacking station 30. The stacking station 30 may include a transverse conveyor 250 that receives rows of the products 12 from the conveyor 240 of the picking station 28 and transports each row transversely to a bin (not shown) causing the rows of products 12 to stack in the bin.

Figure 25B:
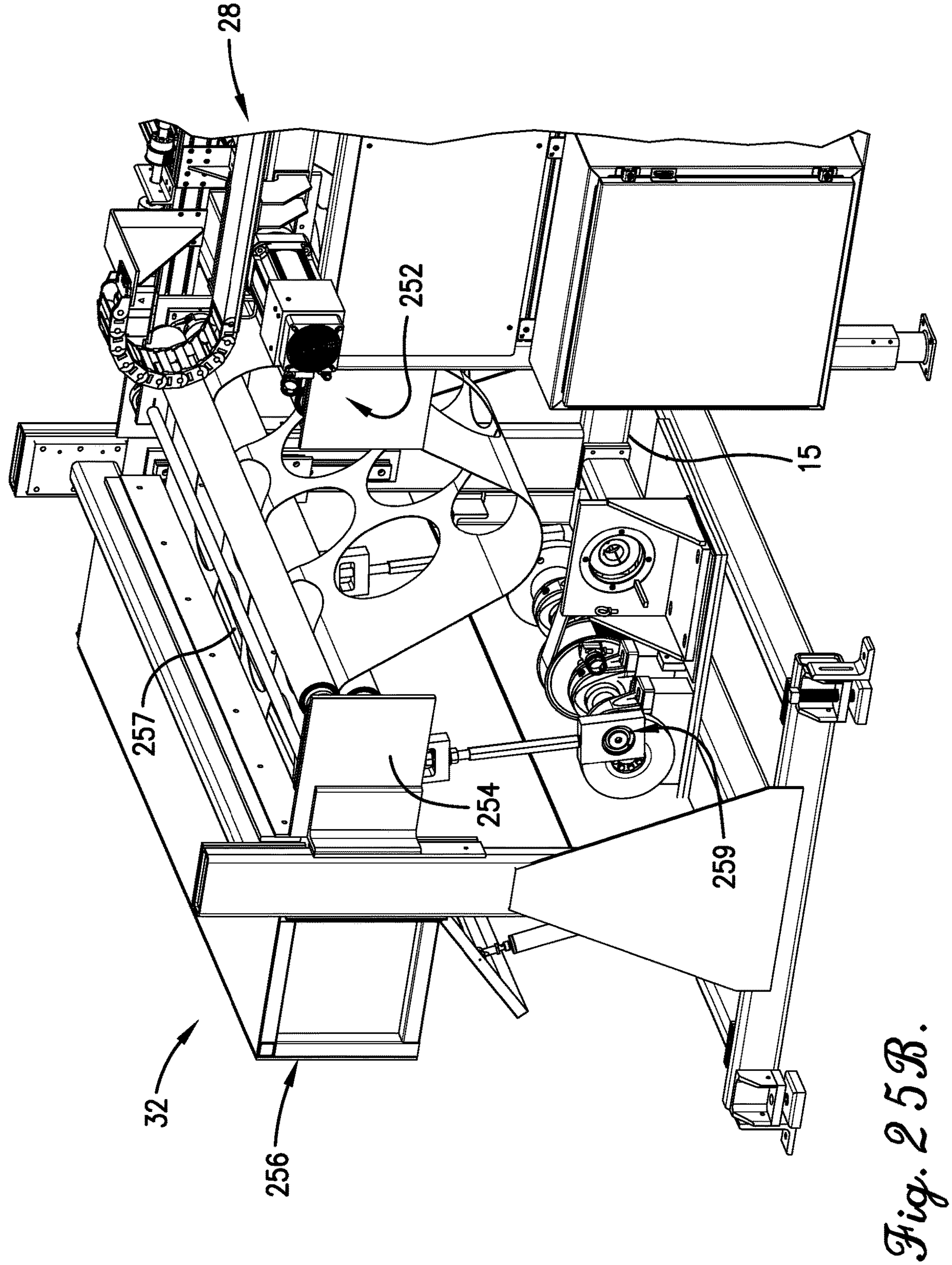
FIG. 25B is a perspective view of the chopping station of FIG. 25A.

The picking station 28 may further include an indexer 252 for transporting the scrap web 15 to the chopping station 32. The chopping station 32 may include an indexer 254 that receives and/or pulls on the scrap web 15 into a scrap chopper 256. Turning to FIG. 25B, the scrap chopper 256 includes an edge 257 for cutting the scrap web 15 and an actuator 259 for actuating the edge 257 so that it presses against the scrap web 15 to cut the scrap web 15 into two or more pieces. The edge 257 may comprise any cutting device without departing from the scope of the present invention, including a knife, cutting blades attached to a rotating shaft (similar to a paper shredder), or the like.

Turning to FIG. 27, various components of the system 10 may be controlled by and/or in communication with the control system 34. The control system 34 may comprise a communication element 258, a memory element 260, a user interface 262, and a processing element 264. The communication element 258 may generally allow communication with systems or devices external to the system 10. The communication element 258 may include signal or data transmitting and receiving circuits, such as antennas, amplifiers, filters, mixers, oscillators, digital signal processors (DSPs), and the like. The communication element 258 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 258 may be in communication with the processing element 264 and the memory element 260.

The memory element 260 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 260 may be embedded in, or packaged in the same package as, the processing element 264. The memory element 260 may include, or may constitute, a "computer-readable medium". The memory element 260 may store the instructions, code, code segments, software, firmware, programs, applications, apps, services, daemons, or the like that are executed by the processing element 264.

The user interface 262 generally allows the user to utilize inputs and outputs to interact with the system 10 and is in communication with the processing element 264. Inputs may include buttons, pushbuttons, knobs, jog dials, shuttle dials, directional pads, multidirectional buttons, switches, keypads, keyboards, mice, joysticks, microphones, or the like, or combinations thereof. The outputs of the present invention include a display 266 (depicted in FIG. 25A) but may include any number of additional outputs, such as audio speakers, lights, dials, meters, printers, or the like, or combinations thereof, without departing from the scope of the present invention.

The processing element 264 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 264 may generally execute, process, or run instructions, code, code segments, software, firmware, programs, applications, apps, processes, services, daemons, or the like. The processing element 264 may also include hardware components such as finite-state machines, sequential and combinational logic, and other electronic circuits that can perform the functions necessary for the operation of the current invention. The processing element 264 may be in communication with the other electronic components through serial or parallel links that include address buses, data buses, control lines, and the like.

For example, the processing element 264 of the control system 34 may be in communication with the decurling station actuator 44 (and its servo motor 90), the decurling station sensor 46, the decurling station motors 72, 74, the scoring station actuator 100 (and its height adjust motor 140, the top platen servo drive 146, and the bottom platen servo drive 148), the scoring station indexers 150, 152, the scoring station force sensor 154, the forming station actuator 160 (including the height adjust motor 220, the top platen servo drive 226, and the bottom platen servo drive 228), the forming station heating elements 176, the forming station indexers 230, 232, the forming station force sensors 234, the picking station conveyor 240, the vacuum cup assembly actuators 244, 245, the stacking station conveyor 250, the picking station indexer 252, the chopping station indexer 254, the scrap chopper 256 (and its actuator 259), and/or other components or sensors. The processing element 264 may be in communication with the above components via the communication element 258 and/or direct wiring. The processing element 264 may be configured to send and/or receive information to and/or from the above components. The processing element 264 may also be configured to send and/or receive commands to and/or from the above components.

The processing element 264 may be configured to direct the decurling station motors 72, 74 to pull the web 14 from the roll of material 16. The processing element 264 may be configured to receive sensor data from the decurling station sensor 46. The processing element 264 may be configured to determine that the radius 20 and/or diameter 18 of the roll of material 16 is decreasing and therefore direct the decurling station actuator 44 (or servo motor 90) to adjust the position of the decurl roller 42—based at least in part on the sensor data—to decrease the angle of web 14 path, i.e., lower the decurl roller 42. Additionally or alternatively, the processing element 264 may be configured to determine a difference in radius 20 and/or diameter 18 or that the radius 20 and/or diameter 18 are below a threshold and then direct the decurling station actuator 44 to adjust the decurl roller 42. The processing element 264 may also be configured to determine that the radius 20 and/or diameter 18 of the roll of material 16 is larger than the previously determined radius 20 and/or diameter 18 and therefore direct the decurling station actuator 44 to adjust the position of the decurl roller 42 to increase the angle, i.e., raise the decurl roller 42. In some embodiments, alternatively or in addition to the sensor data, the processing element 264 may be configured to track an amount of time the roll of material 16 has been pulled, a number of times the web 14 has been pulled, a length of the roll of material 16 that has been pulled, or the like. The processing element 264 may be configured to direct the decurling station actuator 44 to adjust the position of the decurl roller 42 based on the amount of time the roll of material 16 has been pulled, the number of times the web 14 has been pulled, and/or the length of the roll of material 16 that has been pulled.

The processing element 264 may be configured to direct the decurling station motor 74 to activate to push the web 14 to the indexer 152 of the scoring station 24. The processing element 264 may simultaneously direct the indexer 152 to pull the web 14 between the top tool 112 and the bottom tool 114 of the scoring tool 98. The processing element 264 may be configured to direct the scoring station actuator 100 (or the servo motors 146, 148) to shift the tools 112, 114 together to score the web 14. The processing element 264 may be configured to direct the scoring station actuator 100 to shift the tools 112, 114 to a predetermined scoring depth. Further, the processing element 264 may be configured to receive a new predetermined scoring depth (for example, from the user interface 262) and direct the actuator 100 to shift the tools 112, 114 to the new predetermined scoring depth for each stroke. Additionally or alternatively, the processing element 264 may be configured to direct the motor 140 to adjust the height adjust assembly 138 to implement the new predetermined scoring depth. The processing element 264 may be configured to receive a scoring compression force detected by the force sensors 154, and direct the servo motors 146, 148 and/or the height adjust motor 140 so that the scoring compression force remains at or below a predetermined scoring compression force. The processing element 264 may also be configured to direct the indexer 150 to direct the scored web 14 to the forming station 26 in cooperation with the indexer 232 of the forming station 26.

The processing element 264 may be configured to direct the indexers 230, 232 of the forming station 26 to position the web 14 between the forming station tools 172, 174 so that the scored portions 13 of the web 14 are aligned with the molds 184, 200 of the tools 172, 174. The processing element 264 may be configured to direct the forming station actuator 160 (or the servo drive motors 226, 228) to shift the tools 172, 174 to a forming position at a predetermined forming depth, whereby the punches 186 separate the shapes 13 from the web 14. The processing element 264 may be configured to adjust the forming depth by directing the drive motors 226, 228 or directing the servo motor 220 of the forming station height adjust assembly 218. The processing element 264 may be configured to receive a forming compression force detected by the force sensors 234, and direct the servo motors 226, 228 and/or the height adjust motor 220 so that the forming compression force remains at or below a predetermined forming compression force. The processing element 264 may also be configured to activate the heating elements 176 so that the molds 184, 200 are heated and therefore the portions 13 of the web 14 are heated. The processing element 264 may be configured to direct the forming station drive motors 226, 228 to hold the molds 184, 200 at their forming position for a predetermined amount of time. The processing element 264 may then direct the motors 226, 228 to shift open to allow the formed products 12 to be picked by the picking station 28.

The processing element 264 may be configured to direct the picking station actuators 244, 245 to shift the shiftable frame 246 so that the suspended vacuum cups 248 are positioned over the formed products 12. The processing element 264 may be configured to direct the actuator 245 to lower the cups 248 so that they engage the products 12, lift the cups 248 so that the cups 248 pull the products 12 away from their scrap web 15, and shift the cups 248 and products 12 to a position above the conveyor 240. The processing element 264 may be configured to cause the cups 248 to disengage the products 12 so that the products 12 fall onto the conveyor 240.

The processing element 264 may be configured to direct the conveyor 240 to activate so that the products 12 are transported to the transverse conveyor 250, which the processing element 264 may also cause to be activated so that the products 12 are stacked in a bin (not shown). Further, the processing element 264 may be configured to direct the indexers 252, 254 to pull the scrap web 15 into the scrap chopper 256 and to direct the scrap chopper actuator 259 to actuate the edge 257 to cut said scrap web 15.

Figure 28:
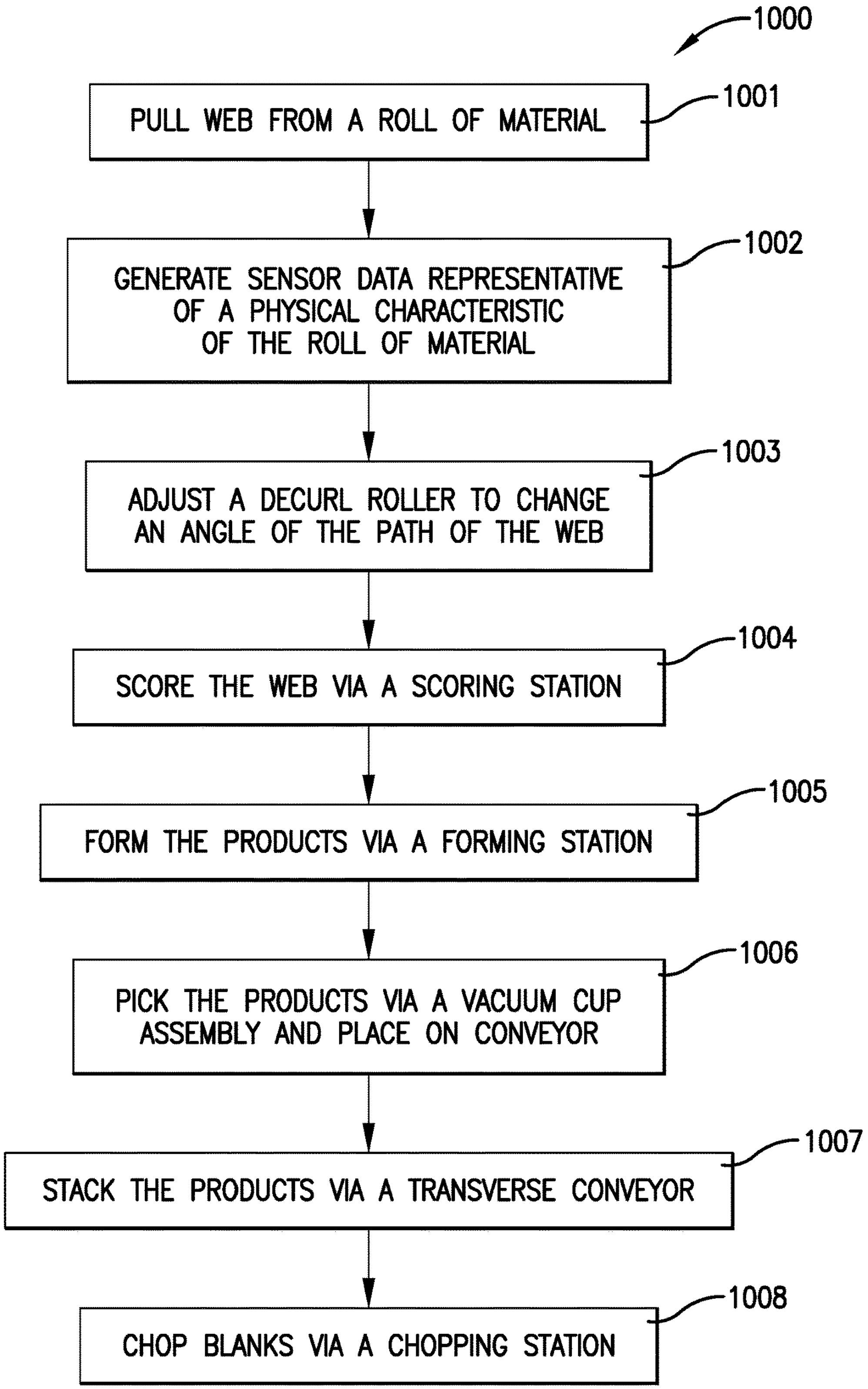
FIG. 28 is a flowchart depicting exemplary steps of a method according to an embodiment of the present invention.

The flow chart of FIG. 28 depicts the steps of an exemplary method 1000 of forming pressware products. In some alternative implementations, the functions noted in the various blocks may occur out of the order depicted in FIG. 28. For example, two blocks shown in succession in FIG. 28 may in fact be executed substantially concurrently, or the blocks may sometimes be executed in the reverse order depending upon the functionality involved. In addition, some steps may be optional.

The method 1000 is described below, for ease of reference, as being executed by exemplary devices and components introduced with the embodiments illustrated in FIGS. 1-27. The steps of the method 1000 may be performed by the control system 34 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 1001, a web may be pulled from a roll of material via pull rollers driven by decurling station motors. The pull rollers may be part of an assembly that includes pinch rollers biased against the pull rollers that cause the pull rollers to grip the web.

Referring to step 1002, sensor data associated with a physical characteristic of the roll of material may be generated via a sensor. The sensor may generate data based on a radius, diameter, weight, or the like, of the roll of material.

Referring to step 1003, a decurl roller is adjusted, via a decurl station actuator, to change an angle of a path of the web based at least in part on the sensor data. As the diameter of the roll of material decreases, the decurl roller is adjusted to decrease the angle so that the angle the web travels is more acute to overcome the intrinsic curl of the web.

Referring to step 1004, the decurled web is pressed by a scoring tool via a scoring station actuator. The tools may be shifted to a predetermined scoring depth. In some embodiments, this step may include receiving a new predetermined scoring depth (for example, from the user interface) and shifting the scoring tool to the new predetermined scoring depth for each stroke. This may include adjusting a height adjust assembly via a servo motor to implement the new predetermined scoring depth. The scores may extend radially outwardly from shapes representing outlines of the products.

Referring to step 1005, the scored web is pressed by a forming tool via a forming station actuator to form the products. The forming tool may be shifted to a forming position at a predetermined forming depth. In some embodiments, this step may include adjusting the forming depth via drive motors and/or a servo motor of a forming station height adjust assembly. This step may also include activating heating elements secured to molds of the forming tool to heat portions of the web. This step may include holding the molds at their forming position for a predetermined amount of time and shifting the forming tool to open and allow the formed products to be picked.

Referring to step 1006, the formed products are picked via a vacuum cup assembly driven by an actuator. This step may include shifting a frame with vacuum cups over the formed products, lowering the vacuum cups so that they engage the products, shifting the frame over a conveyor, and releasing the products from the cups.

Referring to step 1007, the products are stacked via a transverse conveyor. This step may include transporting the products via the conveyor beneath the vacuum cup assembly to the transverse conveyor. The transverse conveyor may receive rows of the products and then transport them transverse to the picker conveyor to stack each row.

Referring to step 1008, the scrap web may be cut via a scrap chopper. This step may include guiding the scrap web to a chopping station via one or more indexers of the picking station and/or the chopping station. The scrap web is then loaded into the scrap chopper, which includes one or more edges, blades, knives, or the like operable to cut the scrap web.

The method 1000 may include additional, less, or alternate steps and/or device(s), including those discussed elsewhere herein.

Figure 29:
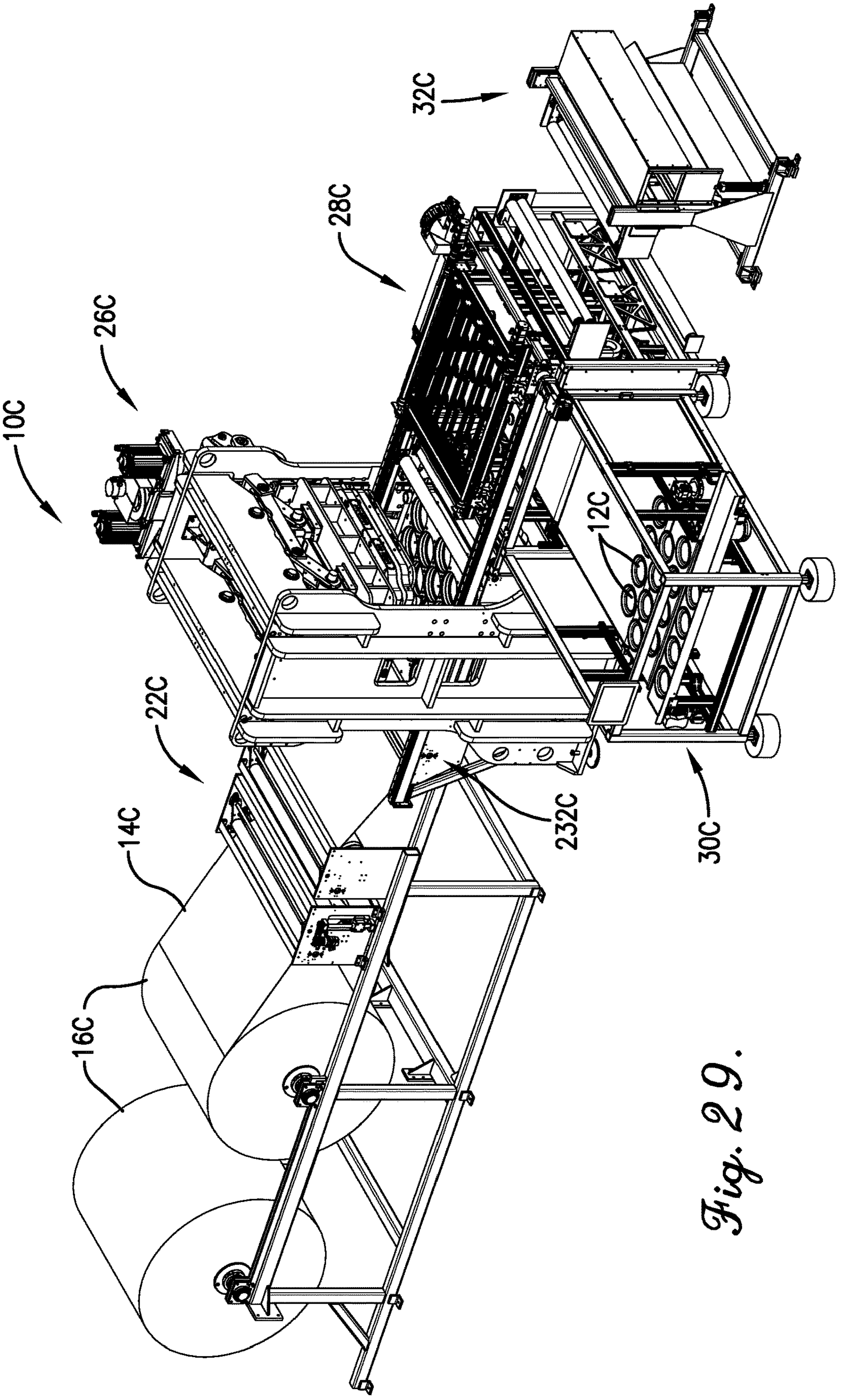
FIG. 29 is a perspective view of a system for producing pressware constructed in accordance with another embodiment of the present invention.

A system 10C constructed in accordance with another embodiment of the invention is shown in FIG. 29. The system 10C comprises some similar components as system 10; thus, the components of system 10C that correspond to similar components in system 10 have the same reference numerals with a 'C' appended thereto.

The system 10C is substantially similar to system 10 except that system 10C does not require a scoring station 24. Instead, the web 14 is passed directly to the forming station 26C. The forming station 26C is configured to cut and/or punch the products 12 from the web 14 without the web 14 needing to be scored first.

Figure 30:
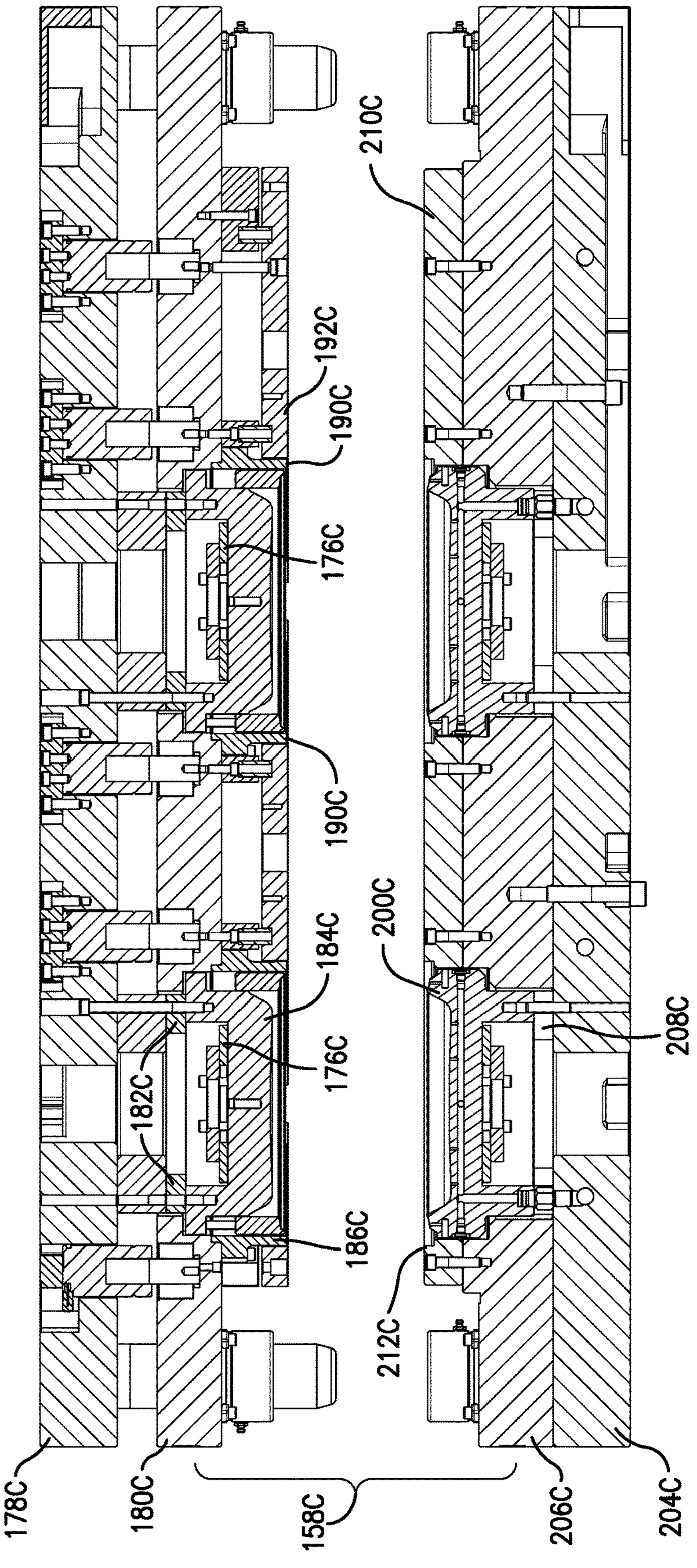
FIG. 30 is a sectional view of the forming tool of FIG. 29 along lines 15-15 (shown in FIG. 15).

Turning to FIG. 30, similar to forming tool 158 of forming station 26, the forming tool 158C comprises the punches 186C having edges 190C configured to cut the shapes from the web 14 along the slots. The negative mold assembly 174C includes a trim die 210C with edges 212C that pinch the web 14 with the punches 186C of the positive mold assembly 172C to remove the products 12 from the web 14.

ADDITIONAL CONSIDERATIONS

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term “processing element” or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A system for producing a pressware product from a web of a roll of material, the system comprising:
- a plurality of rollers configured to pull the web from the roll;
- a forming tool configured to receive the web from the plurality of rollers, the forming tool including:
  - a positive mold assembly comprising a positive mold and a punch, and
  - a negative mold assembly comprising a negative mold complementary to the positive mold and a die complementary to the punch;
- a forming station actuator configured to shift at least one of the positive mold assembly or the negative mold assembly to press the web between the positive mold assembly and the negative mold assembly to form the pressware product in the web and cut the pressware product from the web;
- a suction cup movably suspended at a height above at least one of the positive mold assembly or the negative mold assembly and configured to engage the pressware product; and
- a picking station actuator configured to shift the suction cup away from one of the positive mold assembly or the negative mold assembly to remove the pressware product from the one of the positive mold assembly or the negative mold assembly.

2. The system of claim 1, further comprising a scrap chopper configured to receive a remainder of the web, the scrap chopper including—
- an edge for cutting the remainder of the web, and
- a chopping station actuator configured to press the edge against the remainder of the web to cut the remainder of the web.

3. The system of claim 1, further comprising a conveyor positioned beneath the suction cup and configured to receive the pressware product from the suction cup and transport the pressware product to a container.

4. The system of claim 1, wherein the positive mold comprises a central portion and an annular portion extending about the central portion.

5. The system of claim 4, wherein the annular portion is integrally connected to the central portion.

6. The system of claim 1, wherein the forming tool comprises one or more gas spring configured to help the punch cut the web.

7. The system of claim 1, wherein the positive mold assembly comprises a heating element coupled to the positive mold.

8. The system of claim 1, wherein the plurality of rollers includes an indexing roller.

9. A method of producing a pressware product from a web extending from a roll of material, the method comprising:
- directing the web, via a plurality of rollers, between a positive mold assembly comprising a positive mold and a punch and a negative mold assembly comprising a negative mold complementary to the positive mold and a die complementary to the punch;
- pressing, via a forming station actuator, the web between the positive mold assembly and a negative mold assembly to form the pressware product and trim the pressware product from the web; and
- pulling, via a suction cup, the pressware product from the negative mold assembly or the positive mold assembly.

10. The method of claim 9, wherein pulling the pressware product from the negative mold assembly or the positive mold assembly via the suction cup comprises shifting, via a picking station actuator, the suction cup away from the negative mold assembly or the positive mold assembly and over a conveyor, and releasing the pressware product, via the suction cup, onto the conveyor.

11. The method of claim 9, wherein pressing, via the forming station actuator, comprises:
- pressing, via the forming station actuator, the positive mold assembly and the negative mold assembly against the web for a predetermined amount of time, and
- heating the web via a heating element coupled to a positive mold of the positive mold assembly.

12. The method of claim 9, wherein pressing, via the forming station actuator, comprises actuating the punch of the positive mold assembly via one or more gas spring.

13. The method of claim 9, further comprising adjusting, via a controller, a forming compression force that the forming station actuator applies to the positive mold assembly of the forming tool so that the punch cuts completely through the web.

14. A system for producing pressware products from a web of a roll of material, the system comprising:
- a plurality of rollers configured to pull the web from the roll;
- a forming tool configured to receive the web and including:
  - a positive mold assembly comprising a plurality of positive molds and a plurality of punches, and
  - a negative mold assembly comprising a plurality of negative molds complementary to the positive molds and a die complementary to the punches;

a forming tool actuator configured to shift the positive mold assembly and the negative mold assembly vertically relative to one another to press the web between the positive mold assembly and the negative mold assembly to form the pressware products in the web and cut the pressware products from the web; and a plurality of suction cups movably suspended at a height above at least one of the positive mold assembly or the negative mold assembly and configured to engage the pressware products; and a picking station actuator configured to shift the suction cups away from one of the positive mold assembly or the negative mold assembly to remove the pressware products from the one of the positive mold assembly or the negative mold assembly.

15. The system of claim 14, wherein each of the positive molds includes a central portion and an annular portion extending around the central portion.

16. The system of claim 15, wherein the annular portion is a draw ring that is vertically shiftable relative to the central portion.

17. The system of claim 15, wherein the annular portion is integral to the central portion.

18. The system of claim 14, further comprising a scrap chopper configured to receive a remainder of the web, the scrap chopper including— an edge for cutting the remainder of the web, and a chopping station actuator configured to press the edge against the remainder of the web to cut the remainder of the web.

* * * * *